(12) United States Patent
Nakakubo

(10) Patent No.: US 8,256,740 B2
(45) Date of Patent: Sep. 4, 2012

(54) CONNECTION MECHANISM FOR FLUID PIPINGS, MANUFACTURING METHOD FOR THE SAME, AND FUEL CELL SYSTEM INCLUDING CONNECTION MECHANISM FOR FLUID PIPINGS

(75) Inventor: Toru Nakakubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1096 days.

(21) Appl. No.: 12/094,745

(22) PCT Filed: Aug. 28, 2007

(86) PCT No.: PCT/JP2007/067100
§ 371 (c)(1),
(2), (4) Date: May 22, 2008

(87) PCT Pub. No.: WO2008/026753
PCT Pub. Date: Mar. 6, 2008

(65) Prior Publication Data
US 2009/0269650 A1    Oct. 29, 2009

(30) Foreign Application Priority Data

Aug. 29, 2006  (JP) ................................ 2006-232807

(51) Int. Cl.
*F16K 31/00* (2006.01)
(52) U.S. Cl. ..................... 251/61.2; 251/149.9; 429/438; 29/890.122; 285/119
(58) Field of Classification Search ............... 251/61.2, 251/11, 144, 149.9, 152, 148, 150, 151, 339, 251/147; 137/67, 468, 495, 494, 599.02, 137/798, 505.47, 859, 614.06; 429/438; 29/890.122; 285/119
See application file for complete search history.

(56) References Cited

U.S. PATENT DOCUMENTS

| | | | | |
|---|---|---|---|---|
| 193,174 | A * | 7/1877 | Moss | 137/798 |
| 2,521,069 | A * | 9/1950 | Le Clair | 137/512.3 |
| 5,325,880 | A * | 7/1994 | Johnson et al. | 137/1 |
| 2005/0263189 | A1 | 12/2005 | Nakamura et al. | |
| 2007/0026269 | A1 | 2/2007 | Nakakubo | |

FOREIGN PATENT DOCUMENTS

| | | |
|---|---|---|
| EP | 1 798 623 A1 | 6/2007 |
| JP | 2004-031199 A | 1/2004 |

(Continued)

OTHER PUBLICATIONS

Machine Translation of JP 2004-031199 A, Jan. 29, 2004.*

(Continued)

*Primary Examiner* — John K Fristoe, Jr.
*Assistant Examiner* — Andrew J Rost
(74) *Attorney, Agent, or Firm* — Fitzpatrick, Cella, Harper & Scinto

(57) ABSTRACT

A connection mechanism for fluid pipings, for connecting a plurality of the fluid pipings to flow a fluid, includes: a first component provided to one side of the plurality of the fluid pipings and including a movable portion constituting a part of a pressure control valve and operated by a differential pressure; a second component provided to another side of the plurality of the fluid pipings and including an opening and closing mechanism which is opened and closed by an operation of the movable portion constituting the part of the pressure control valve; and a transmission mechanism provided to at least one of the first component and the second component.

14 Claims, 17 Drawing Sheets

FOREIGN PATENT DOCUMENTS

| | | |
|---|---|---|
| JP | 2004-211818 A | 7/2004 |
| JP | 2004-293777 A | 10/2004 |
| JP | 2005-227867 A | 8/2005 |
| JP | 2005-339321 A | 12/2005 |
| JP | 2006-114017 A | 4/2006 |

OTHER PUBLICATIONS

A. Debray et al., "A Passive Micro Gas Regulator for Hydrogen Flow Control," 15 J. Micromech. Microeng. S202-S209 (Aug. 2005).

* cited by examiner

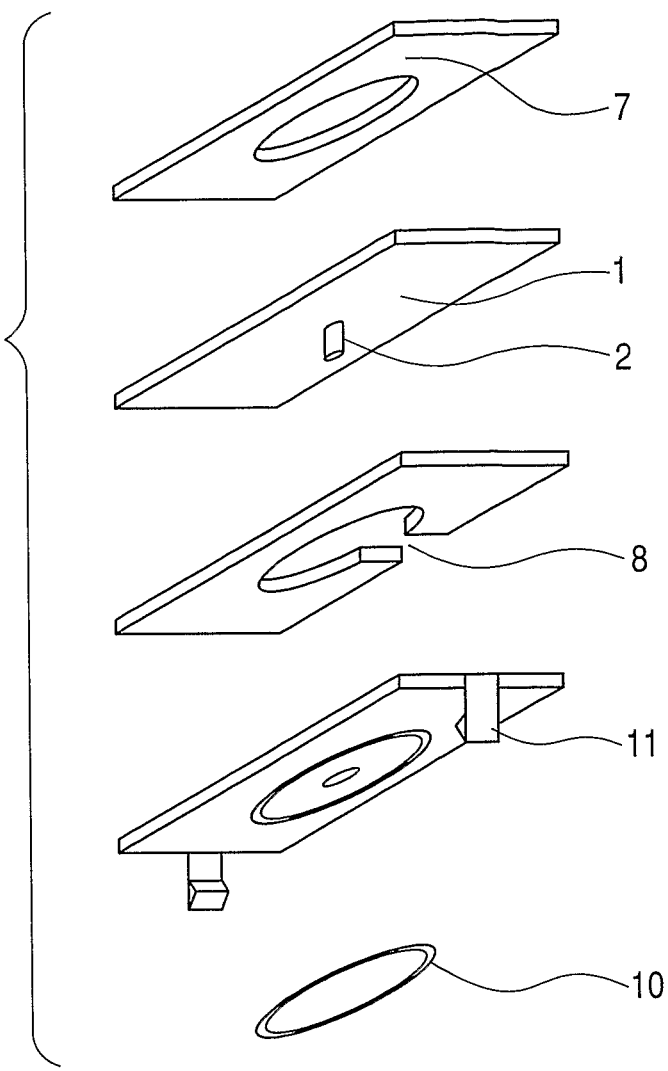
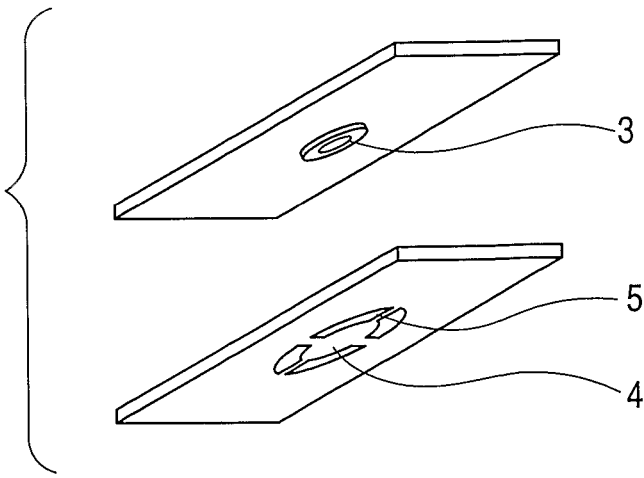

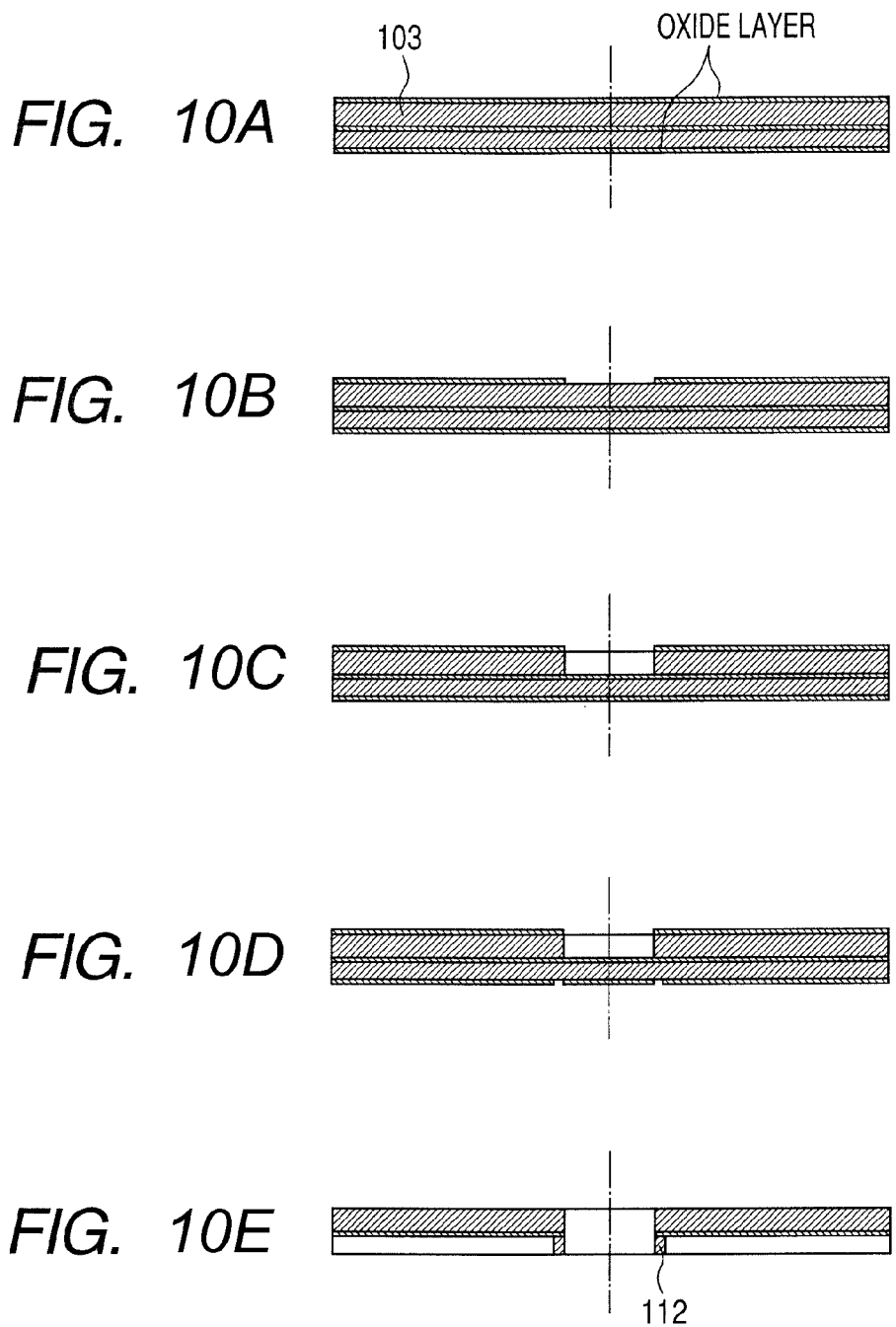

| TEMPERATURE (°C) | 20 | 25 | 50 | 100 |
|---|---|---|---|---|
| DISSOCIATION PRESSURE (atm) | 1.5 | 2 | 4 | 20 |

CONNECTION MECHANISM FOR FLUID PIPINGS, MANUFACTURING METHOD FOR THE SAME, AND FUEL CELL SYSTEM INCLUDING CONNECTION MECHANISM FOR FLUID PIPINGS

TECHNICAL FIELD

The present invention relates to a connection mechanism for fluid pipings, for connecting the pipings to flow a fluid, a manufacturing method for the same, and a fuel cell system in which the connection mechanism for fluid pipings is provided between a fuel container and a power generation mechanism.

BACKGROUND ART

Conventionally, as a coupler for connecting pipings to flow a fluid, there has been proposed various types.

Normally, the coupler has a structure as disclosed in Japanese Patent Application Laid-Open No. 2004-211818. That is, at a time when the pipings are not connected, at least one of ports is in a closed state so as to prevent a fluid from leaking to the outside. When the pipings are connected, the fluid can flow.

This is realized by providing a check valve to one side of the coupler and a pressure pin for pushing and opening the check valve to the other side of the coupler.

Further, there are provided a gasket for preventing the fluid from leaking to the outside at the time of connection and a lock mechanism for preventing the coupler from being easily detached.

On the other hand, by using a mechanical machining technique, there have been manufactured various types of pressure reducing valves.

The pressure reducing valves are broadly categorized into active drive type and passive drive type.

The active drive pressure reducing valve includes a pressure sensor, valve drive means, and a control mechanism, in which a valve is driven such that a secondary pressure is reduced to a set pressure.

Further, the passive drive pressure reducing valve has a structure in which when a set pressure is reached, by employing a differential pressure, the valve is automatically opened and closed.

Further, the passive drive pressure reducing valves are roughly categorized into pilot operated-type and direct acting-type.

The pilot operated-type pressure reducing valve has a pilot valve and is characterized by performing a stable operation.

The direct acting-type pressure reducing valve has an advantage with respect to a high-speed response. For the pilot operated-type pressure reducing valve, when a gas is used as a working fluid, in order to reliably perform opening and closing of a valve even with a minute force of a compressed fluid, a diaphragm is often used as a differential pressure sensing mechanism.

With regard to a small pressure reducing valve, for example, as disclosed in Japanese Patent Application Laid-Open No. 2004-031199, there is proposed a structure including a diaphragm, a valve body, and a valve shaft for directly connecting the valve body and the diaphragm to each other.

Known as a manufacturing method for the pressure reducing valve having the above-mentioned structure is a manufacturing method as disclosed in A. Debray et al, J. Micromech. Microeng., 15, S202-S209, 2005. The manufacturing method is characterized in that a semiconductor processing technique is employed to manufacture small mechanical components.

In the semiconductor processing technique, a semiconductor substrate is used as a material and a structure is formed by employing techniques such as film formation, photolithography, and etching in combination with each other.

Therefore, there are provided characteristics in which a fine processing of a submicron order is possible and a mass production is facilitated due to a batch process.

In particular, the pressure reducing valve has a complicated three-dimensional structure, so there are employed reactive ion etching (ICP-RIE) for vertically etching a semiconductor substrate and a bonding technique for bonding a plurality of semiconductor plates.

Further, a valve body and a valve seat are bonded to each other through an intermediation of a sacrifice layer of a silicon oxide or the like. In a latter half of a process, the sacrifice layer is etched, thereby allowing the valve body to be released from the valve seat.

On the other hand, as an energy source to be mounted on a small electrical equipment, a small fuel cell receives attention. A reason why the fuel cell is useful as a driving source for the small electrical equipment is that an energy amount which can be supplied per volume or per weight is several times to ten times that of a conventional lithium-ion secondary battery.

In particular, in a fuel cell for obtaining a large output, it is most desirable that hydrogen be used as a fuel.

However, hydrogen is gaseous at normal temperature, and a technique for storing hydrogen in a small fuel tank at high density is required.

Known examples of the technique for storing hydrogen include the following methods.

A first method is a method including compressing hydrogen to be preserved in a form of a high pressure gas.

When a pressure of the gas in a tank is 200 atmosphere, a volume hydrogen density is about 18 mg/cm$^3$.

A second method is a method including maintaining hydrogen at low temperature to be stored in a form of a liquid.

In order to liquefy hydrogen, a large energy is required and the liquefied hydrogen is naturally vaporized to leak out, which is a problem. However, by this method, preservation at high density is possible.

A third method is a method including using a hydrogen storage alloy to store hydrogen.

In this method, a specific gravity of the hydrogen storage alloy is large, so, on a weight basis, there is a problem in that only about 2 wt % of hydrogen can be stored, thereby making the fuel tank heavier. However, on a volume basis, a hydrogen storage amount is large, so the third method is effective for downsizing.

In particular, in the small fuel cell, due to handleability and a large hydrogen charging amount per volume, there is often used the third method in which hydrogen is stored in a hydrogen storage alloy.

When all hydrogen in a fuel container is consumed by power generation, in order to continue the power generation, hydrogen is needed to be newly charged.

Replenishment of hydrogen can be performed in a state where a power generation portion of the fuel cell is kept connected to the fuel container. However, there is also a case where the replenishment is performed in a state where the fuel container is removed from the power generation portion.

This is because, while a pressure in the fuel container is high at the time of charging and it is desirable that the container be cooled at the time of charging, the pressure and a temperature history should be prevented from adversely affecting the power generation portion.

Further, also in view of convenience and economy, rather than possessing and carrying a plurality of fuel cells, it is desirable that only a plurality of fuel containers be carried, and, when a fuel container in use becomes empty, the fuel container be replaced with a new fuel container.

Thus, there is often employed a method in which a coupler is provided between the fuel container and the fuel cell power generation portion so that the fuel container becomes detachable.

As the coupler described above, as disclosed, for example, in Japanese Patent Application Laid-Open No. 2004-293777, there is proposed a coupler having a structure in which a plug and a socket can be separated from each other by an external force.

On the other hand, power generation of a polymer electrolyte fuel cell is performed as follows.

For a polymer electrolyte membrane, a perfluorosulfonic acid cation exchange resin is often used.

For example, for a film described above, Nafion manufactured by DuPont or the like is well known.

A membrane electrode composite, which is obtained by sandwiching the polymer electrolyte membrane between a pair of porous electrodes bearing catalysts such as platinum, that is, a fuel electrode and an oxidizer electrode, constitutes a power generation cell.

With respect to the power generation cell, by supplying an oxidizer to the oxidizer electrode and a fuel to the fuel electrode, proton moves in a polymer electrolyte membrane, thereby performing the power generation.

A polymer electrolyte membrane retaining a mechanical strength and normally having a thickness of about 50 to 200 µm is used in order to prevent a fuel gas from transmitting therethrough.

A strength of the polymer electrolyte membrane is about 3 to 5 $kg/cm^2$. Accordingly, in order to prevent breakage of a film due to a differential pressure, it is desirable that the differential pressure between an oxidizer electrode chamber and a fuel electrode chamber of the fuel cell be controlled so as to be 0.5 $kg/cm^2$ in a normal state or equal to or less than 1 $kg/cm^2$ even in an emergency.

In a case where a differential pressure between the fuel tank and the oxidizer electrode chamber is smaller than the above-mentioned differential pressure, the fuel tank and the fuel electrode chamber are directly connected to each other and there is no particular need for pressure reduction.

However, in a case where the oxidizer electrode chamber is open to air and a fuel is charged at higher density, in a process of feeding the fuel from the fuel tank to the fuel electrode chamber, there is a need for pressure reduction.

Further, the above-mentioned mechanism is required also for stabilizing starting and stopping operation of the power generation and generated energy.

In Japanese Patent Application Laid-Open No. 2004-031199, a small valve is provided between the fuel tank and the fuel cell unit, thereby preventing the fuel cell unit from suffering breakage due to a large differential pressure, controlling starting and stopping of the power generation, and stabilizing the generated energy.

In particular, a diaphragm is used at a boundary between a fuel supply path and an oxidizer supply path, and is directly connected to a valve, thereby realizing a pressure reducing valve which is driven by a differential pressure between the fuel supply path and the oxidizer supply path without using electricity and which optimally controls a pressure of a fuel to be fed to the fuel cell unit.

Japanese Patent Application Laid-Open No. 2005-339321 proposes a dual valve-type pressure regulator having a structure in which a portion including a primary regulating valve and a portion including a secondary regulating valve are separated from each other and one of the portions is provided on the fuel tank side and the other thereof is provided on the fuel cell side, the portions being detachable from each other.

DISCLOSURE OF THE INVENTION

However, according to the conventional example, the structure provided between the fuel tank and the fuel cell unit is not always satisfactory as a coupler.

For example, the conventional coupler disclosed in Japanese Patent Application Laid-Open No. 2004-211818 or Japanese Patent Application Laid-Open No. 2004-293777 does not have a pressure regulating function. Therefore, pressures of the pipings on both sides are substantially the same with each other at the time of connection. Thus, in a case where it is desired that the pressure be reduced at the time of connection to feed a fluid of a constant pressure, it is required that the pressure reducing valve be provided separately in the flow path.

Further, in the structure according to the conventional example of Japanese Patent Application Laid-Open No. 2004-031199, the diaphragm (movable portion), the piston (transmission mechanism), and the valve body are integrated with each other. Therefore, there is a problem with using those as a coupler by separating those from each other. Further, in the structure according to the conventional example of Japanese Patent Application Laid-Open No. 2005-339321, the portion including the primary regulating valve and the portion including the secondary regulating valve are separated from each other. The structure can be used as the coupler having the pressure regulating function between the fuel tank and the fuel cell unit.

However, since the portion including the primary regulating valve and the portion including the secondary regulating valve are separated from each other, the structure is complicated, and further, it is difficult to meet a recent demand of a small fuel cell system for further downsizing.

In particular, in the primary regulating valve, a spring for closing the valve is positioned on an extended piston axis and a side opposite to the piston with respect to the valve body. Thus, the number of layers of the pressure reducing valve increases, thereby complicating the structure. Further, in this case, in order to prevent positional deviation of the valve body, it is required that a guide be provided to the valve body or the piston separately from the spring. Further, in a small pressure reducing valve, it is difficult to drive the valve because it is extremely difficult to manufacture a small bearing, so friction in a guide portion is large. Further, a structure obtained by stacking thick members as described above is difficult to be manufactured by the semiconductor processing technique advantageous for downsizing and mass production, etching, or press working.

In view of the above-mentioned problems, it is an object of the present invention to provide a connection mechanism for fluid pipings having a simpler structure, thereby enabling further downsizing, and functioning as a pressure reducing valve, a manufacturing method for the same, and a fuel cell system including the connection mechanism for fluid pipings.

Further, it is another object of the present invention to provide a connection mechanism for fluid pipings having a simpler structure, thereby enabling further downsizing, functioning as a pressure reducing valve, and also functioning as a temperature shut-off valve, a manufacturing method for the same, and a fuel cell system including the connection mechanism for fluid pipings.

In order to solve the above-mentioned problem, the present invention provides a connection mechanism for fluid pipings structured as described below, a manufacturing method for the same, and a fuel cell system including the connection mechanism for fluid pipings.

According to the present invention, there is provided a connection mechanism for fluid pipings, for connecting a plurality of the fluid pipings to flow a fluid, characterized in that:

the connection mechanism for fluid pipings includes:
a first component provided to one side of the plurality of the fluid pipings and including a movable portion constituting a part of a pressure control valve and operated by a differential pressure;
a second component provided to another side of the plurality of the fluid pipings and including an opening and closing mechanism which is opened and closed by an operation of the movable portion constituting the part of the pressure control valve; and
a transmission mechanism provided to at least one of the first component and the second component, wherein:
the opening and closing mechanism includes a valve seat portion, a valve body portion, and a support portion for supporting the valve body portion;
the support portion supports the valve body portion so that the valve body portion and the valve seat portion can be opened and closed with respect to each other according to the operation of the movable portion, which is transmitted by the transmission mechanism;
the support portion for supporting the valve body portion is made of an elastic body, which is provided on a plane perpendicular to an operation direction of the transmission mechanism and including the valve body portion, for supporting the valve body portion; and
the plurality of the fluid pipings provided with the first component and the plurality of the fluid pipings provided with the second component are connected to each other, thereby constituting, in a part where the plurality of the fluid pipings are connected to each other, the pressure control valve for transmitting the operation of the movable portion to the opening and closing mechanism through the transmission mechanism.

Further, a connection mechanism for fluid pipings is characterized in that the movable portion includes a diaphragm.

Further, a connection mechanism for fluid pipings is characterized in that the pressure control valve functions as a pressure reducing valve.

Further, a connection mechanism for fluid pipings is characterized in that the support portion for supporting the valve body portion partially includes a temperature displacement portion which displaces the valve body portion to a closing position at a temperature equal to or higher than a threshold value.

Further, a connection mechanism for fluid pipings is characterized in that the temperature displacement portion is made of a shape memory alloy.

Further, a connection mechanism for fluid pipings is characterized in that the temperature displacement portion is made of bimetal.

Further, a connection mechanism for fluid pipings is characterized in that the pressure control valve functions as the pressure reducing valve and also functions as a temperature shut-off valve.

Further, a connection mechanism for fluid pipings is characterized in that:
the opening and closing mechanism is made of an elastic body having a through hole extending in a direction perpendicular to the operation direction of the transmission mechanism; and
the through hole is opened and closed by a tip portion of the transmission mechanism according to the operation of the movable portion transmitted by the transmission mechanism.

Further, a connection mechanism for fluid pipings is characterized in that at least one of the first component and the second component includes a gasket for preventing the fluid from leaking from portions where the plurality of the fluid pipings come into contact with each other when the plurality of the fluid pipings provided with the first component and the plurality of the fluid pipings provided with the second component are connected to each other.

Further, a connection mechanism for fluid pipings is characterized in that at least one of the first component and the second component includes a lock mechanism for maintaining connection between the plurality of the fluid pipings provided with the first component and the plurality of the fluid pipings provided with the second component when the plurality of the fluid pipings provided with the first component and the plurality of the fluid pipings provided with the second component are connected to each other.

Further, a connection mechanism for fluid pipings is characterized in that the movable portion constituting a part of the pressure control valve and operated by the differential pressure, the opening and closing mechanism which is opened and closed by the operation of the movable portion, and the transmission mechanism are each formed from a sheet-like member or a plate-like member, the movable portion, the opening and closing mechanism, and the transmission mechanism being stacked on each other, thereby constituting the connection mechanism.

Further, according to the present invention, there is provided a manufacturing method for a connection mechanism for fluid pipings,
the connection mechanism including:
a first component provided to one side of the plurality of the fluid pipings and including a movable portion constituting a part of a pressure control valve and operated by a differential pressure;
a second component provided to another side of the plurality of the fluid pipings and including an opening and closing mechanism which is opened and closed by an operation of the movable portion constituting the part of the pressure control valve; and
a transmission mechanism provided to at least one of the first component and the second component,
the manufacturing method being characterized by including the steps of:
forming the movable portion to be provided to one side of the plurality of the fluid pipings from a sheet-like member or a plate-like member;
forming the transmission mechanism from the sheet-like member or the plate-like member;
forming a valve seat portion, a valve body portion, and a support portion for supporting the valve body portion from the sheet-like member or the plate-like member to integrally serve as the opening and closing mechanism to be provided to another side of the plurality of the fluid pipings; and
forming a gasket from the sheet-like member or the plate-like member on one of a side of the movable portion or a side of the opening and closing mechanism.

Further, a manufacturing method for a connection mechanism for fluid pipings is characterized in that at least a part of the sheet-like member or the plate-like member includes a semiconductor substrate.

Further, according to the present invention, there is provided a fuel cell system including:
a fuel container;
a fuel cell power generation portion; and
a connection mechanism for fluid pipings, which is provided between the fuel container and the fuel cell power generation portion, the connection mechanism for the fluid pipings being characterized by including the connection mechanism for fluid pipings according to any one of the above-mentioned aspects or the connection mechanism for fluid pipings manufactured by the manufacturing method for a connection mechanism for fluid pipings according to one of the above-mentioned aspects.

According to the present invention, a connection mechanism for fluid pipings having a simpler structure, thereby enabling further downsizing and functioning as a pressure reducing valve, a manufacturing method for the same, and a fuel cell system including the connection mechanism for fluid pipings can be realized.

Further, according to the present invention, a connection mechanism for fluid pipings having a simpler structure, thereby enabling further downsizing, functioning as a pressure reducing valve, and also functioning as a temperature shut-off valve, a manufacturing method for the same, and a fuel cell system on which the connection mechanism for fluid pipings is mounted can be realized.

BRIEF DESCRIPTION OF THE DRAWINGS

FIGS. 2A, 2B, and 2C are views for illustrating a support portion in the first structural example of the connection mechanism according to Example 1 of the present invention, in which FIG. 2A is a plan view for illustrating a first embodiment of the support portion, FIG. 2B is a plan view for illustrating a second embodiment of the support portion, and FIG. 2C is a plan view for illustrating a third embodiment of the support portion.

FIGS. 6A and 6B are exploded perspective views for illustrating the first structural example of the connection mechanism according to Example 1 of the present invention.

FIGS. 7A and 7B are views for illustrating another structural example of a movable portion of the connection mechanism according to Example 1 of the present invention, in which FIG. 7A is a side sectional view of the another structural example of the movable portion and FIG. 7B is a bottom view thereof.

FIGS. 8A and 8B are views for illustrating another structural example of a lock mechanism of the connection mechanism according to Example 1 of the present invention, in which FIG. 8A is a view illustrating a structure on a side having a movable portion and FIG. 8B is a view illustrating a structure on a side having a valve portion.

FIGS. 10A, 10B, 10C, 10D, and 10E are process charts for illustrating manufacture procedures subsequent to those of FIGS. 9A, 9B, 9C, 9D, 9E, and 9F of the connection mechanism having the movable portion according to Example 2 of the present invention.

BEST MODE FOR CARRYING OUT THE INVENTION

Best modes for carrying out the present invention will be described by way of the following examples.

EXAMPLE 1

In Example 1, a description will be made of a first structural example of a connection mechanism to which the present invention is applied.

Figure 1A:
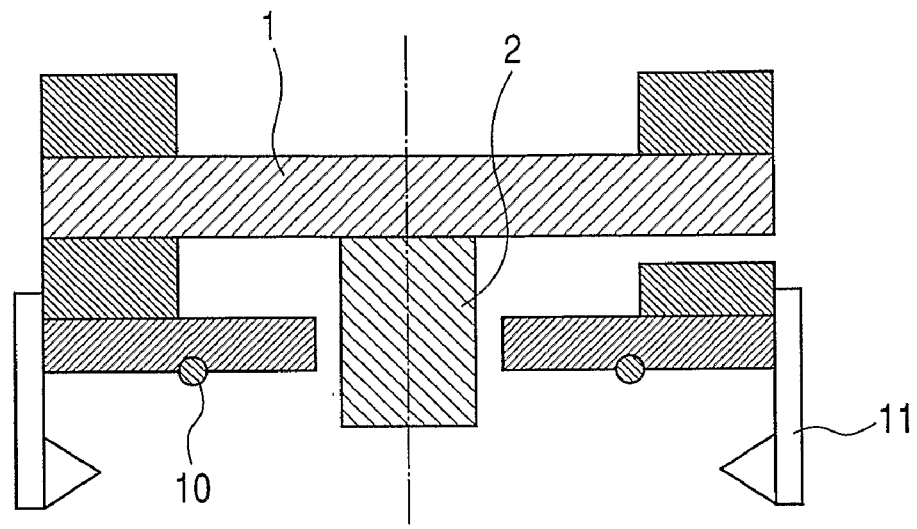
FIGS. 1A and 1B are sectional views for illustrating a first structural example of a connection mechanism according to Example 1 of the present invention.
Figure 1B:
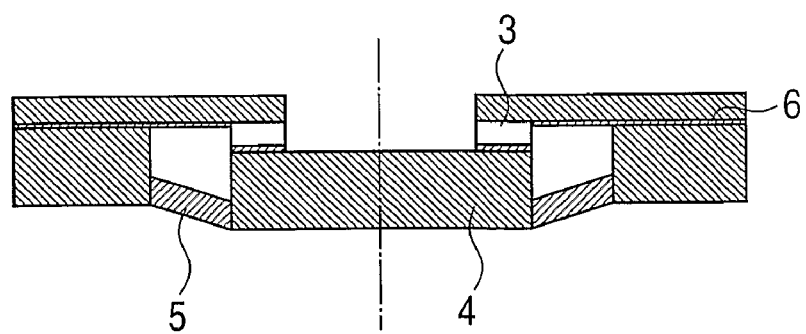

FIGS. 1A and 1B illustrate sectional views for illustrating a structure of the connection mechanism according to this example.

In FIGS. 1A and 1B, there are provided a diaphragm 1 serving as a movable portion, a piston 2 serving as a transmission mechanism, a valve seat portion 3 forming a valve portion, a valve body portion 4, a support portion 5, a seal 6, a gasket 10, and a lock mechanism 11.

In this example, one side of the connection mechanism includes the diaphragm 1 serving as the movable portion, the piston 2 serving as the transmission mechanism, the gasket 10, and the lock mechanism 11 which are to be connected to one side of a plurality of pipings.

On the other hand, the other side of the connection mechanism of this example includes the valve seat portion 3 forming the valve portion, the valve body portion 4, the support portion 5, and the seal 6 which are to be connected to another side of the plurality of pipings.

Figure 2A:
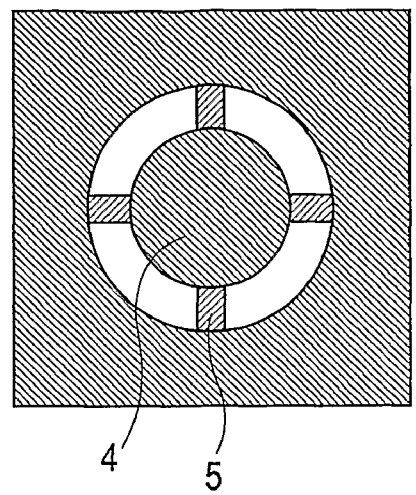
Figure 2B:
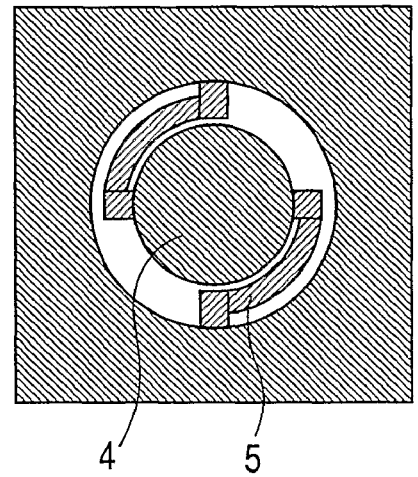
Figure 2C:
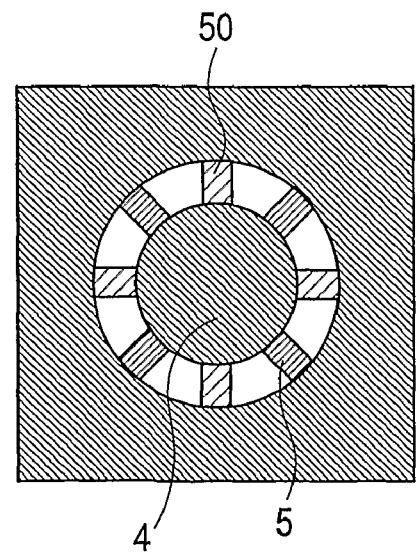

In this case, the support portion 5 is formed by a beam having elasticity (elastic body) and is provided on a plane perpendicular to an operating direction of the transmission mechanism 2 and including the valve body portion 4. For example, the support portion 5 may employ a first embodiment as illustrated in FIG. 2A or a second embodiment as illustrated in FIG. 2B. Further, in a third embodiment as illustrated in FIG. 2C, the valve body portion 4 may be supported by the support portion 5 and a temperature displacement portion 50.

In this case, the temperature displacement portion 50 may be formed by a shape memory alloy such as a titanium-nickel alloy.

The shape memory alloy of the titanium-nickel alloy may be formed by sputtering.

The temperature displacement portion 50 undergoes elastic deformation at a normal temperature, and does not affect spring characteristics of the above-mentioned support portion 5. Thus, a function as a normal pressure reducing valve can be obtained.

When a temperature around the pressure reducing valve abnormally rises and becomes equal to or more than a predetermined temperature, the shape memory alloy of the temperature displacement portion 50 is deformed so as to be warped toward the valve seat portion 3, thereby pressing the valve body portion 4 to the valve seat portion 3, thus obtaining a closed state.

In a region where the temperature is smaller than a threshold value, the temperature displacement portion 50 does not exert the function thereof. Therefore, as in a case with the normal pressure reducing valve, a flow rate is realized while retaining a secondary pressure.

Further, when the temperature rises and exceeds the threshold value, the shape memory alloy of the temperature displacement portion 50 functions to lift up the valve body portion 40, thereby allowing the valve to be closed to function as a temperature shut-off valve.

In contrast, when the temperature becomes lower than the threshold value, the valve functions as the normal pressure reducing valve. As a result, the valve can reversibly be used.

As described above, by providing the temperature displacement portion 50 formed by the shape memory alloy to the pressure reducing valve, when the temperature is lower than the threshold temperature, the valve can function as the pressure reducing valve, and when the temperature is equal to or higher than the threshold temperature, the valve can function as the temperature shut-off valve. As a result, a valve function with higher safety can be exhibited.

In this case, there is indicated an example in which the shape memory alloy is used for the temperature displacement portion 50, however, a material (for example, bimetal) displaced according to a temperature can be used to obtain the same effect.

Further, in this case, there is illustrated the example in which the support portion 5 and the temperature displacement portion 50 are arranged so as to be separated from each other. However, there may be used a temperature displacement material employing a metal material having spring characteristics for the support portion 5.

According to this example, the transmission mechanism 2, the gasket 10, and the lock mechanism 11 may be provided on any one of the side having the movable portion and the side having the valve portion.

Figure 3A:
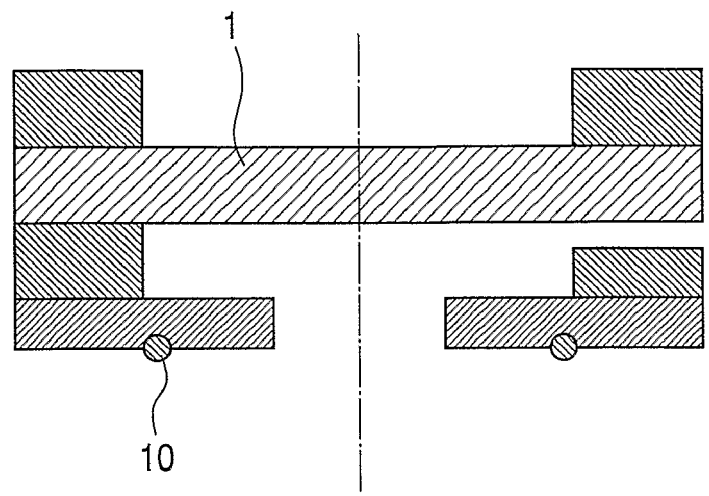
FIGS. 3A and 3B are sectional views for illustrating application examples in the first structural example of the connection mechanism according to Example 1 of the present invention.
Figure 3B:
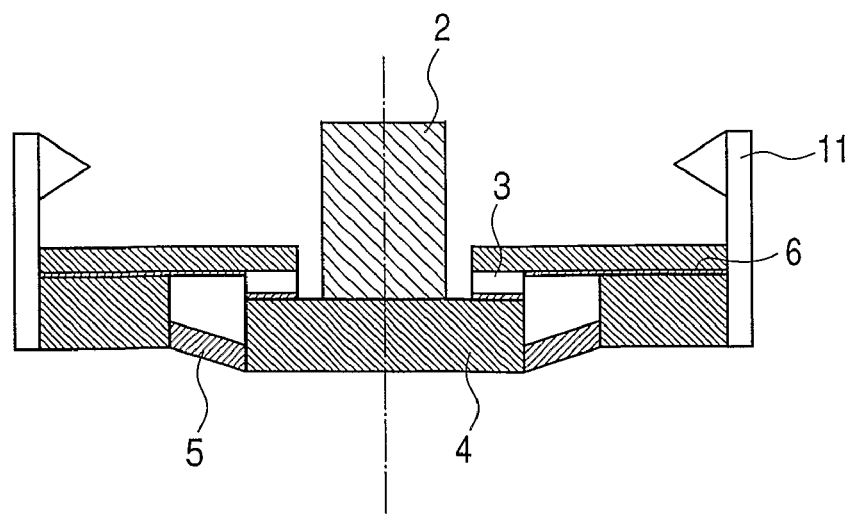

For example, as illustrated in FIGS. 1A and 1B, those may be provided on the side having the movable portion. Alternatively, as illustrated in FIGS. 3A and 3B, those may be provided on the side having the valve portion. In the drawings, the same reference numerals as those of FIGS. 1A and 1B denote the same members.

Further, the pipings on the diaphragm (movable portion) 1 side are connected to a flow path positioned on a lower-right side of the diaphragm (movable portion) 1 illustrated in FIG. 1A. Normally, an upper portion of the diaphragm (movable portion) 1 comes into contact with the atmosphere.

On the other hand, the pipings of the connection mechanism having the valve portion is connected thereto from the lower part of the valve body portion 4 illustrated in FIG. 1B.

Figure 4:
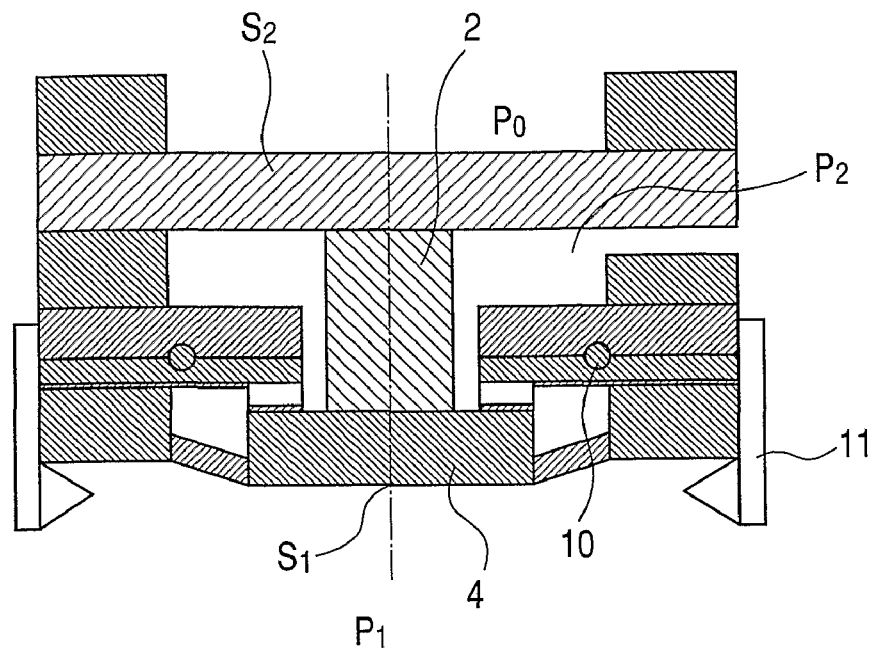
FIG. 4 is a view (of a closed state) for illustrating a pressure and a sectional area of components in the first structural example of the connection mechanism according to Example 1 of the present invention.
Figure 5:
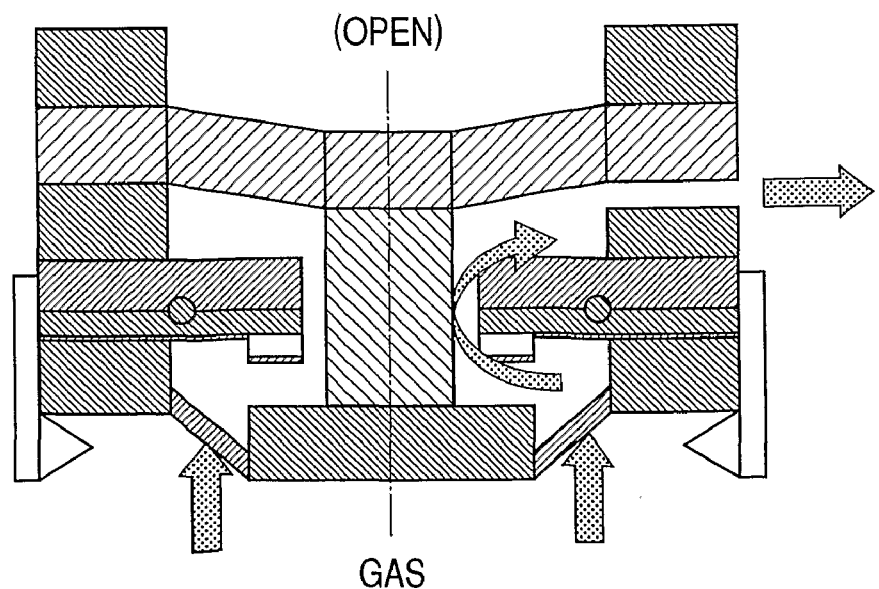
FIG. 5 is a sectional view for illustrating a state where a valve is opened in the first structural example of the connection mechanism according to Example 1 of the present invention.

With reference to FIGS. 4 and 5, an operation of the pressure reducing valve according to this example will be described.

FIG. 4 is a sectional view of the connection mechanism of this example when connected. The connection mechanism having the diaphragm (movable portion) and the connection mechanism having the valve portion are coupled to each other and are locked by the lock mechanism 11.

Further, on a contact surface, the gasket 10 prevents a fluid flowing inside from leaking to the outside.

The movable portion 1 and the valve body portion 4 are opposed to each other through an intermediation of the piston (transmission mechanism) 2. However, the piston (transmission mechanism) 2 is not necessarily brought into contact with both the movable portion 1 and the valve body portion 4.

Figure 8A:
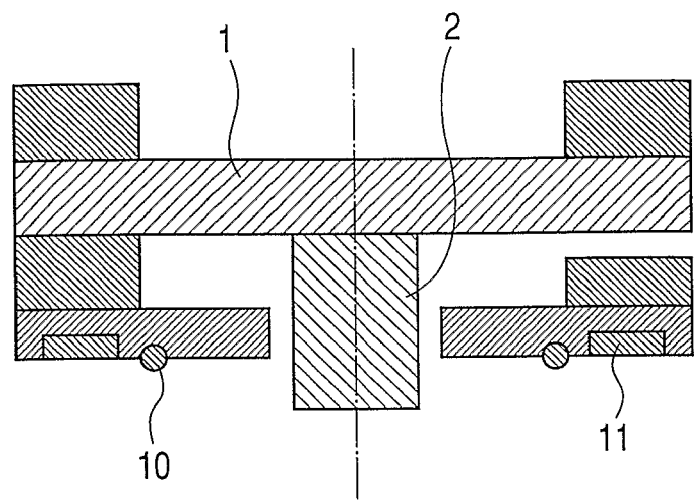
Figure 8B:
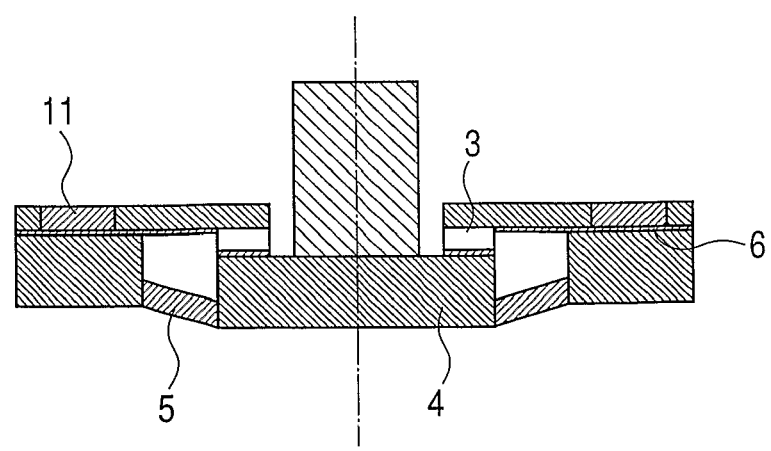

Further, as illustrated in FIG. 8, the lock mechanism 11 may employ a spring, but, for example, magnets are embedded in contact portions of the connection mechanism at the time of connection so that a connection state can be maintained by an attraction force between the magnets.

In particular, by using electromagnets using coils as the magnets, connection and disconnection may be controlled by an electric signal.

Further, by using magnets for the lock mechanism and an actuator including a piezoelectric element or the like for disconnection and connection, a mechanism can be realized, in which electric power is used only for connection or disconnection operation and the electric power is not required normally.

A pressure in the upper portion of the diaphragm (movable portion) 1 is denoted by $P_0$, a primary pressure in an upstream of the valve is denoted by $P_1$, a secondary pressure in a downstream of the valve is denoted by $P_2$, an area of the valve body portion 4 is denoted by $S_1$, and an area of the diaphragm (movable portion) 1 is denoted by $S_2$. The diaphragm (movable portion) is operated by a differential pressure $(P_0-P_2)$.

In this case, a condition under which, due to a balance of the pressures, the valve is opened as illustrated in FIG. 5 is represented by $(P_1-P_2)S_1 < (P_0-P_2)S_2$. When the pressure $P_2$ is higher than a pressure under this condition, the valve is closed, and when the pressure $P_2$ is lower than the pressure under this condition, the valve is opened. As a result, the pressure $P_2$ can be maintained constant.

By adjusting an area of the valve body 4 and an area of the diaphragm (movable portion) 1, a length of the piston (transmission mechanism) 2, a thickness of the diaphragm (movable portion) 1, and a shape of the beams of the support portion 5, a pressure and a flow rate at which the valve is opened and closed can be set optimally.

In particular, in a case where a spring constant of the diaphragm (movable portion) 1 is larger than a spring constant of the support portion 5, the pressure at which the valve is opened depends on the diaphragm (movable portion) 1.

Conversely, in a case where the spring constant of the support portion 5 is larger than the spring constant of the diaphragm (movable portion) 1, a behavior of the valve depends on the support portion 5.

Further, according to a difference between the length of the piston (transmission mechanism) 2 and a distance from the diaphragm (movable portion) 1 to the valve body portion 4 at the time of connection, the secondary pressure $P_2$ varies.

That is, the larger the length of the piston (transmission mechanism) 2 is, when compared to the distance from the diaphragm (movable portion) 1 to the valve body portion 4, the higher the secondary pressure $P_2$ becomes. The smaller the length of the piston (transmission mechanism) 2 is, when compared to the distance from the diaphragm (movable portion) 1 to the valve body portion 4, the lower the secondary pressure $P_2$ becomes.

On the other hand, in a case where the pressure $P_2$ in the downstream of the valve is higher than a set pressure, the diaphragm (movable portion) 1 is warped upwardly and the valve is closed.

At this time, the valve body portion 4 and the piston (transmission mechanism) 2 are not connected with each other, so the valve body portion 4 stops when the valve body portion 4 comes into contact with the valve seat portion 3, and only the piston (transmission mechanism) 2 moves with diaphragm (movable portion) 1.

Also in a case where, as illustrated in FIGS. 3A and 3B, the transmission mechanism 2 is integrated with the valve body portion 4 and is isolated from the movable portion 1, an operation principle is the same as that of the structure illustrated in FIGS. 1A and 1B.

The connection mechanism of this example can be manufactured by using a mechanical machining technique, for example, in the following manner.

FIGS. 6A and 6B are exploded perspective views in a case where the connection mechanism of this example is viewed from the valve body portion 4 side. The connection mechanism is constructed by stacking members formed by processing a sheet-like member and a plate-like member. In FIGS. 6A and 6B, there are provided the movable portion 1, the transmission mechanism 2, the valve seat portion 3, the valve body portion 4, the support portion 5, a presser plate 7, an outlet flow path 8, the gasket 10, and the lock mechanism 11.

First, for the diaphragm (movable portion) 1, there can be used an elastic material such as Viton rubber and silicone rubber, a metal material such as stainless steel and aluminum, plastics, or the like.

For example, in a case where stainless steel is used as a material of the diaphragm (movable portion) 1, the transmission mechanism can be integrated therewith by etching, cutting, or the like.

Figure 7A:
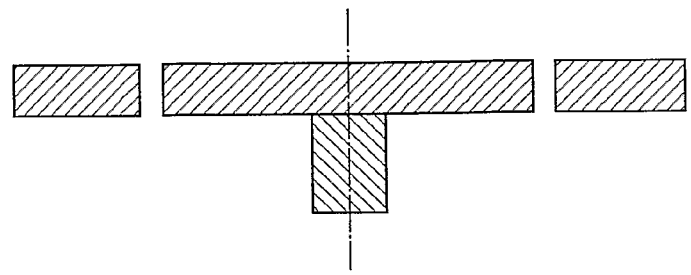
Figure 7B:
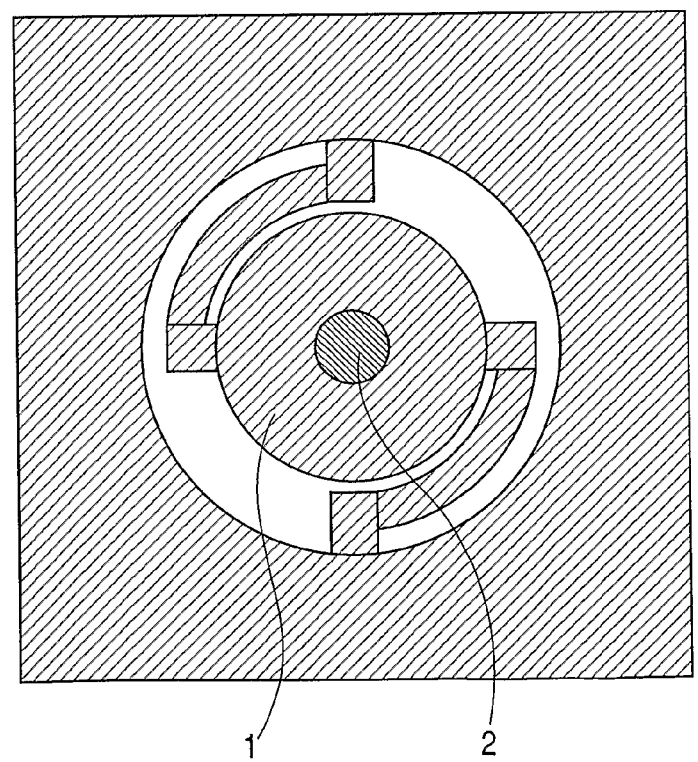

Alternatively, as illustrated in a side sectional view and a bottom view of FIGS. 7A and 7B, respectively, the diaphragm (movable portion) 1 can be divided into a plate spring mechanism having a pattern and an elastic film for maintaining air tightness.

With this structure, a degree of freedom of a design of the diaphragm (movable portion) 1 regarding elasticity thereof can be increased.

The plate spring mechanism can be manufactured by etching the metal material such as stainless steel. On the other hand, as a material of the film, a sheet made of silicone rubber, Viton rubber, polyimide, or the like can be used.

Further, a space below the diaphragm (movable portion) 1 and a flow path through which the piston (transmission mechanism) 2 passes can be manufactured by mechanical machining or etching of the stainless steel.

A liquid adhesive may be used to bond these parts. However, a sheet (hotmelt sheet) which is melted by heat and hardened by cooling to bond the parts may be used in order to facilitate processing and assembly. The hotmelt sheet includes one using polyolefin-based material, and one in which an adhesive is applied on a polyethylene terephthalate (PET) substrate, thereby enabling to use the PET substrate as a constitutional material.

For example, the latter hotmelt sheet may be used as follows. The plate spring structure shown in FIGS. 7A and 7B is manufactured by metal press working. Then PET substrate with a thickness of 0.1 mm provided with the hotmelt sheet having an adhesive layer on one surface of the substrate is prepared. Then the PET substrate and the plate spring structure are hot-pressed, whereby the diaphragm (movable portion) 1 and the piston (transmission mechanism) 2 are integrally formed.

Alternatively, as a member having the outlet flow path 8, a PET substrate with a thickness of 0.1 mm provided with the hotmelt sheet having an adhesive layer on both surfaces of the substrate is prepared. The PET substrate is interposed between the upper member and the lower member. Then all the members are hot-pressed, thereby bonding the upper and lower members.

The valve seat portion 3 and the support portion 5 can be processed so as to be integrated with each other. Alternatively, the support portion 5 may be formed of another material in advance to be adhered to the valve seat portion 3.

For the processing, mechanical machining such as cutting, etching, or the like can be employed.

Coating of a sealing material for the valve seat portion 3 or for the valve body portion may be performed by evaporating parylene, a fluorine-based material, or the like, or by applying silicone rubber, polyimide, or a fluorine-based material through spin coating or spraying. Further, a rubber material such as silicone rubber and Viton sheet can be adhered or molded.

For the gasket 10, an O-ring of the rubber material, Teflon (registered trademark), or the like can be employed.

The lock mechanism 11 may be integrated with a member of an inlet portion of the flow path, or may be manufactured separately to be adhered thereto or screwed therewith.

Of the manufacturing methods, a method in which a constitutional member is manufactured by metal press working, and then the constitutional member is bonded with a hotmelt sheet is excellent in view of size-reduction, pressing and assembly.

It is desirable in view of cost that a seal portion is sealed by baking of a rubber material.

A specific preparation example is described below. An outer dimension of the connection mechanism is assumed to be 8 mm by 8 mm.

First, the connection mechanism on the side having the movable portion is manufactured.

The presser plate 7 is manufactured by forming a hole having a diameter of 3.6 mm in a stainless steel plate having a thickness of 0.3 mm by etching.

Next, the diaphragm (movable portion) 1 is formed by two members in which as an elastic sheet, there is used a Viton sheet having a thickness of 0.3 mm.

Further, the members shown in FIGS. 7A and 7B can be integrally manufactured by etching stainless steel such that the plate spring portion has a thickness of 0.05 mm and the piston (transmission mechanism) 2 portion is a columnar protrusion having a diameter of 0.26 mm and a length of 0.35 mm.

In fact, the etching of the stainless steel is isotropic. Therefore, the piston (transmission mechanism) 2 is formed in a tapered shape.

A flow path below the diaphragm (movable portion) 1 is formed by using a stainless steel plate having a thickness of 0.05 mm and provided with a hole having a diameter of 3.6 mm. A member having an inlet flow path can be manufactured by etching a stainless steel plate having a thickness of 0.15 mm to be provided with a gasket groove and a flow path.

The gasket 10 is formed by baking a rubber material (thickness of 0.05 mm).

The lock mechanism 11 is formed of a stainless-steel plate spring.

Next, the connection mechanism on the side having the valve portion is manufactured.

The valve seat portion 3 is obtained such that a hole having a diameter of 0.4 mm is formed on a stainless plate having a thickness of 0.15 mm at a center thereof, and a protrusion is formed by etching the stainless plate by a depth of 0.05 mm with a periphery of the hole being left as it is to have a width of 0.1 mm.

On the other hand, the valve body and the support portion 5 are obtained in the following manner. The valve body portion 4 having a diameter of 1 mm is formed at the center of a stainless plate having a thickness of 0.3 mm and the support portion is formed by etching to have a shape illustrated in FIG. 2B so as to have a width of 0.1 mm and a thickness of 0.05 mm.

The valve seat portion 3 and the valve body portion 4 are coated by vacuum deposition of parylene as the seal material 6 so as to have a thickness of 0.01 mm.

The pressure reducing valve of the connection mechanism manufactured as described above allows the secondary pressure to be about 0.8 atmosphere (absolute pressure) when the atmospheric pressure is about 1 atmospheric pressure (absolute pressure).

In particular, an outer dimension of the connection mechanism is 8 mm by 8 mm and a thickness of about 1 mm at the time of connection. That is, an extremely small connection mechanism can be obtained.

Further, a part or all of the members described in this example may be manufactured by employing a semiconductor processing technique described in the following examples for use.

EXAMPLE 2

In Example 2, a description will be made of a processing method of manufacturing the connection mechanism having the structure according to Example 1 using a semiconductor substrate by a semiconductor processing technique.

Dimensions of members of the connection mechanism manufactured in this example can be set as follows, for example. However, the dimensions can be changed according to a design.

A diaphragm (movable portion) can have a diameter of 3.6 mm and a thickness of 40 μm. A piston (transmission mechanism) can have a diameter of 260 μm and a length of 200 to 400 μm. A piston passage portion flow path can have a diameter of 400 μm.

A protruding portion can have a width of 20 μm, a height of 10 μm, and a thickness of a sealing layer of 5 μm. The valve body portion can have a diameter of 1000 μm and a thickness of 200 μm. The support portion can have a length of 1000 μm, a width of 200 μm, and a thickness of 10 μm.

Next, a description will be made of a manufacture method for the connection mechanism having the movable portion.

FIGS. 9A to 9F, 10A to 10E, and 11A to 11F, illustrate steps of manufacturing the connection mechanism by the above-mentioned manufacturing method.

Figure 9A:
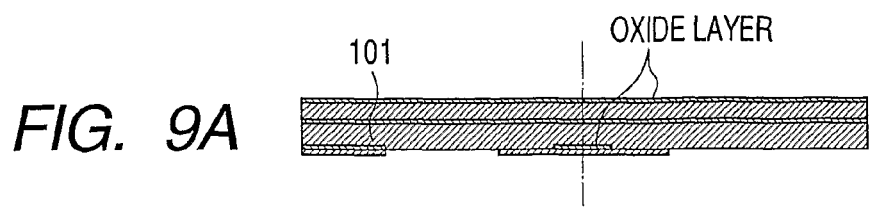
FIGS. 9A, 9B, 9C, 9D, 9E, and 9F are process charts for illustrating manufacture procedures of the connection mechanism having the movable portion according to Example 2 of the present invention.

A first step illustrated in FIG. 9A is a mask patterning process for etching.

As a first silicon wafer 101, a silicon wafer with one side thereof being polished may be used, but a silicon wafer with both sides thereof being polished is desirable for use.

Further, in subsequent etching processes, in order to control a depth of the etching, a silicon-on-insulator (SOI) wafer can desirably be used.

For example, a silicon wafer having a handle-layer thickness of 200 μm, an oxide-layer (BOX-layer) thickness of 1 μm, and a device-layer thickness of 40 μm is used.

In order to provide a mask used for the etching, a surface of the first wafer 101 is subjected to thermal oxidation.

Into a furnace heated to about 1000° C., hydrogen and oxygen of a predetermined amount are allowed to flow, thereby forming the oxide layer on the surface of the wafer.

Next, in order to perform etching of two stages in this process and a next process, a mask having a two-layer structure formed by a silicon oxide layer and a photoresist is formed. The photoresist is applied by spin coating, is prebaked, and is then exposed to light to perform patterning for manufacturing a transmission mechanism 115. Further, development and postbaking are performed.

While the photoresist is used as the mask, the oxide layer is etched by hydrofluoric acid.

Further, a mask used for forming a flow path on a lower surface of a diaphragm (movable portion) 111 is patterned.

That is, a photoresist is applied by spin coating, is prebaked, and is then exposed to light. Further, development and postbaking are performed. In this example, for a mask of two stages, the photoresist and a silicon oxide layer are used. However, in place of those, silicon oxide layers having different thicknesses may be used, alternatively, an aluminum layer may be used.

Figure 9B:
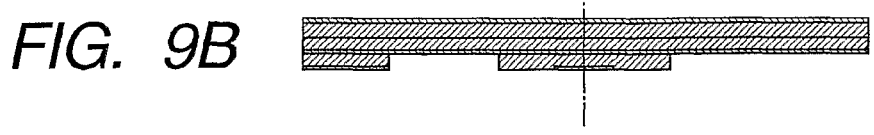

A second step illustrated in FIG. 9B is a process of forming the flow path on the lower surface of the diaphragm (movable portion) 111 by reactive ion etching (ICP-RIE).

Figure 9C:
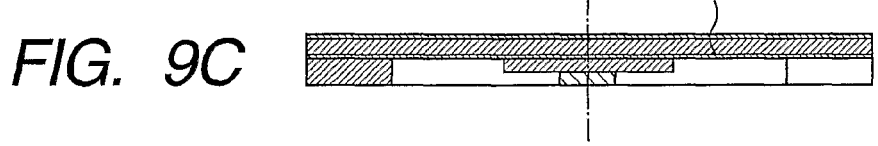

A depth of etching is controlled according to an etching period. In this case, etching of about 100 μm is performed. At last, the photoresist mask is removed by acetone. A third step illustrated in FIG. 9C is a process of manufacturing the transmission mechanism 115.

By the reactive ion etching (ICP-RIE), the wafer is etched. A depth of the etching may be controlled according to a period, or, as illustrated in FIG. 9C, the oxide layer (BOX layer) of the SOI wafer is used as an etching stop layer.

Further, the silicon oxide layer used as the mask is removed by hydrofluoric acid.

Figure 9D:
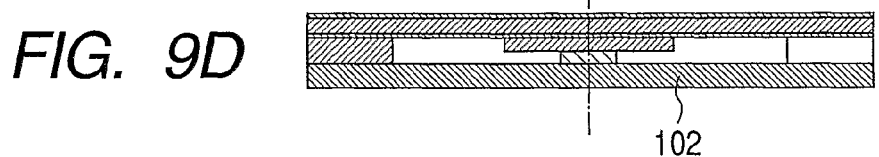

A fourth step illustrated in FIG. 9D is a direct bonding process for the wafer.

As the second silicon wafer, a wafer with both sides thereof being polished is preferably used. As the silicon wafer, for example, a silicon wafer having a thickness of 300 µm can be used.

Next, the first wafer 101 and a second wafer 102 are subjected to SPM cleaning (cleaning in a mixture solution of hydrogen peroxide water and sulfuric acid heated to 80° C.), and are then cleaned with dilute hydrofluoric acid.

The first wafer 101 and the second wafer 102 are stacked on each other and are applied with a pressure of about 1500 N. At the same time, a sample is heated for three hours to 1100° C. The heated sample is held for four hours. After that, annealing is performed by self-cooling.

Figure 9E:
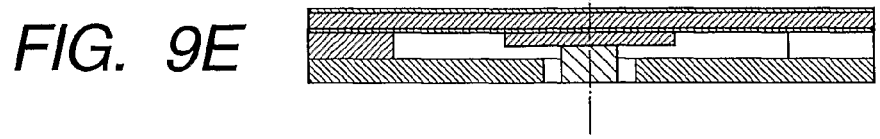

A fifth step illustrated in FIG. 9E is a process of forming the transmission mechanism 115.

To a back surface of the wafer, a photoresist is applied by spin coating, and is prebaked, and is then exposed to light. By the reactive ion etching (ICP-RIE), etching is performed to form the transmission mechanism 115.

Figure 9F:
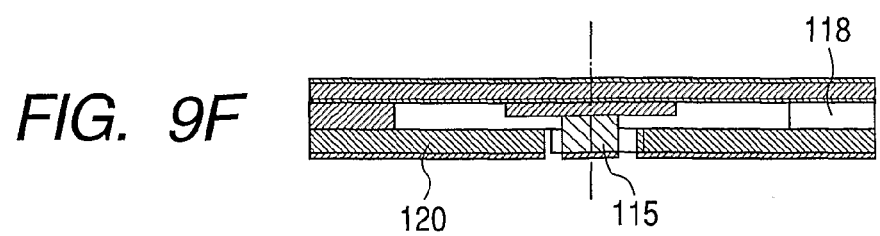

A sixth step illustrated in FIG. 9F is a process of forming a gasket 120. There is provided an outlet flow path 118. Coating may be performed for the connection mechanism having the movable portion or the connection mechanism having the valve portion.

Examples of a coating material include parylene, Cytop, polytetrafluoroethylene (PTFE), and polyimide.

The coating can be performed with parylene or PTFE by vacuum deposition or with Cytop or polyimide by spin coating.

Other than those, the coating by spraying is also possible.

Next, a description will be made of a manufacture method for the connection mechanism having the valve portion.

A seventh step illustrated in FIG. 10A is a process of performing thermal oxidation of a third wafer 103.

As the wafer, a wafer with both sides thereof being polished is desirably used. Further, in subsequent etching processes, in order to control a depth of etching, a silicon-on-insulator (SOI) wafer is desirably used.

As a silicon wafer, for example, a silicon wafer having a handle-layer thickness of 150 µm, an oxide-layer (BOX-layer) thickness of 1 µm, a device-layer thickness of 10 µm can be used.

The thermal oxidation is performed by flowing a predetermined amount of hydrogen and oxygen into a furnace heated to about 1000° C.

An eighth step illustrated in FIG. 10B is a process of manufacturing a mask for forming a flow path.

The oxide layer on the back surface is protected by a photoresist, patterning of an oxide layer on a front surface is performed.

On the front surface of the wafer, the photoresist is applied by spin coating, is prebaked, and is then exposed to light. Further, development and postbaking are performed.

The photoresist is used as a mask to etch the oxide layer by hydrofluoric acid, thereby performing patterning for forming a flow path.

After the patterning, the photoresists on the front surface and the back surface are removed by acetone.

A ninth step illustrated in FIG. 10C is a process of forming a flow path.

Etching is performed by the reactive ion etching (ICP-RIE).

A tenth step illustrated in FIG. 10D is a process of manufacturing a mask for forming a valve seat 112.

Patterning of the oxide layer on the back surface of the wafer is performed. The photoresist is applied to the back surface of the wafer by spin coating, is prebaked, and is then exposed to light.

Further, development and postbaking are performed. The photoresist is used as a mask to etch the oxide layer by hydrofluoric acid, thereby performing patterning for forming the valve seat 112.

After the patterning, the photoresist is removed by acetone.

An eleventh step illustrated in FIG. 10E is a process of forming the valve seat 112.

Etching is performed by reactive ion etching (ICP-RIE). At last, Si oxide used for a mask is removed by hydrofluoric acid.

Figure 11A:
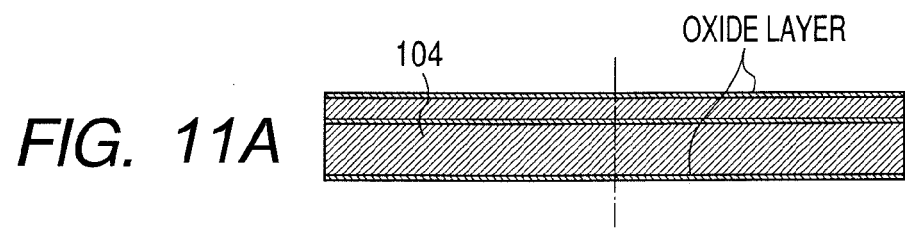
FIGS. 11A, 11B, 11C, 11D, 11E, and 11F are process charts for illustrating manufacture procedures subsequent to those of FIGS. 10A, 10B, 10C, 10D, and 10E of the connection mechanism having the movable portion according to Example 2 of the present invention.

A twelfth step illustrated in FIG. 11A is a process of performing thermal oxidation of a fourth wafer 104.

A wafer with one side thereof being polished may be used, but a wafer with both sides thereof being polished is desirably used.

Further, in subsequent etching processes, in order to control a depth of etching, a silicon-on-insulator (SOI) wafer is desirably used.

A silicon wafer having a handle-layer thickness of 150 µm, an oxide-layer (BOX-layer) thickness of 1 µm, a device-layer thickness of 10 µm can be used, for example. The thermal oxidation is performed by flowing a predetermined amount of hydrogen and oxygen into a furnace heated to about 1000° C.

Figure 11B:
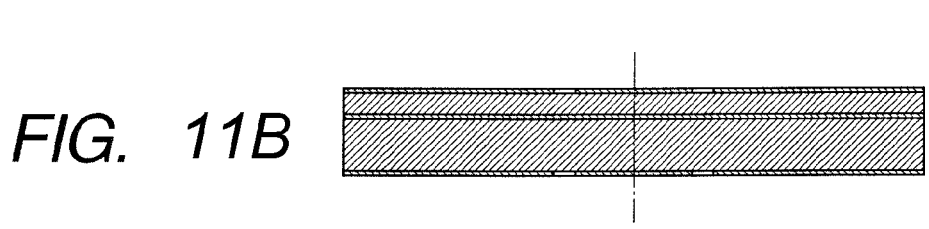

A thirteenth step illustrated in FIG. 11B is a process of manufacturing a mask for forming a valve body portion 113.

An oxide layer on a front surface of the wafer is protected by a photoresist. After that, patterning of an oxide layer on a back surface thereof is performed.

To the front surface of the wafer, the photoresist is applied by spin coating, is prebaked, and is then exposed to light. Further, development and postbaking are performed.

The photoresist is used as a mask to etch the oxide layer by hydrofluoric acid, thereby performing patterning for forming the valve body portion 113.

After the patterning, the photoresists on the front surface and the back surface are removed by acetone.

Figure 11C:
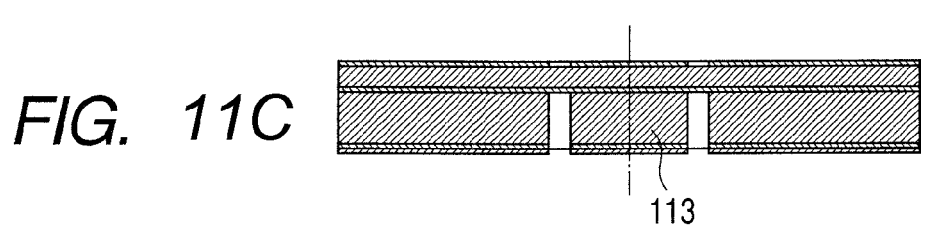

A fourteenth step illustrated in FIG. 11C is a process of forming the valve body portion 113.

To the back surface of the wafer, the photoresist is applied by spin coating, is prebaked, and is then exposed to light. Etching is performed by reactive ion etching (ICP-RIE).

Figure 11D:
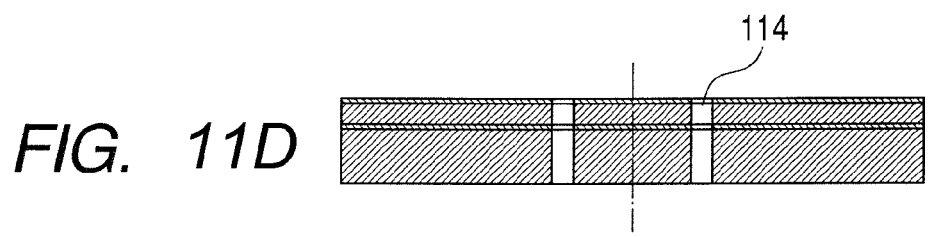

A fifteenth step illustrated in FIG. 11D is a process of manufacturing a mask for forming a support portion 114.

Patterning of the oxide layer on the front surface of the wafer is performed. To the front surface of the wafer, the photoresist is applied by spin coating, is prebaked, and is then exposed to light.

Further, development and postbaking are performed. The photoresist is used as a mask to etch the oxide layer by hydrofluoric acid, thereby performing patterning for forming the support portion 114.

After the patterning, the photoresist is removed by acetone. Next, etching is performed by reactive ion etching (ICP-RIE).

At last, Si oxide used for the mask is removed by hydrofluoric acid.

Figure 11E:
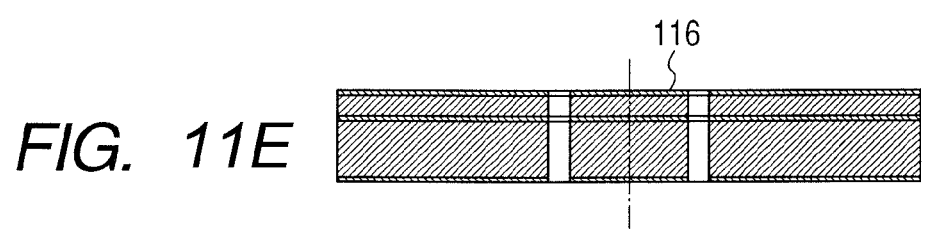

A sixteenth step illustrated in FIG. 11E is a process of performing coating of a seal surface. There is provided a seal material 116.

The coating may be performed on the valve body side as illustrated in FIG. 11E, or may be performed on the valve seat side.

Examples of the coating material include parylene, Cytop, polytetrafluoroethylene (PTFE), and polyimide.

The coating can be performed with parylene or PTFE by vacuum deposition or with Cytop or polyimide by spin coating. Other than those, the coating by spraying is also possible.

Figure 11F:
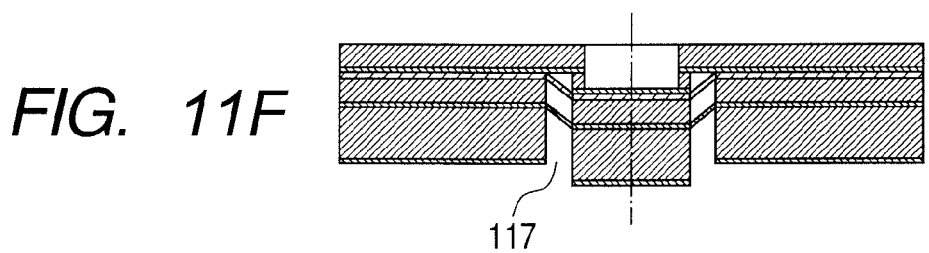

A seventeenth step illustrated in FIG. 11F is an assembling process. There is provided an inlet flow path 117.

A member having the diaphragm (movable portion) 111 and the valve seat portion 112 manufactured in the steps from the first step to the sixth step and a member having the valve body portion 113 manufactured in the steps from the seventh step to the eleventh step are superposed on each other, thereby completing a small pressure reducing valve.

In this example, bonding is performed by using a diffusion bonding technique for silicon. A method including forming metal films on bonding surfaces in advance and performing bonding by the metal films, or an adhesive or the like may be employed.

EXAMPLE 3

In Example 3, a description will be made of a second structural example of a connection mechanism.

Figure 12A:
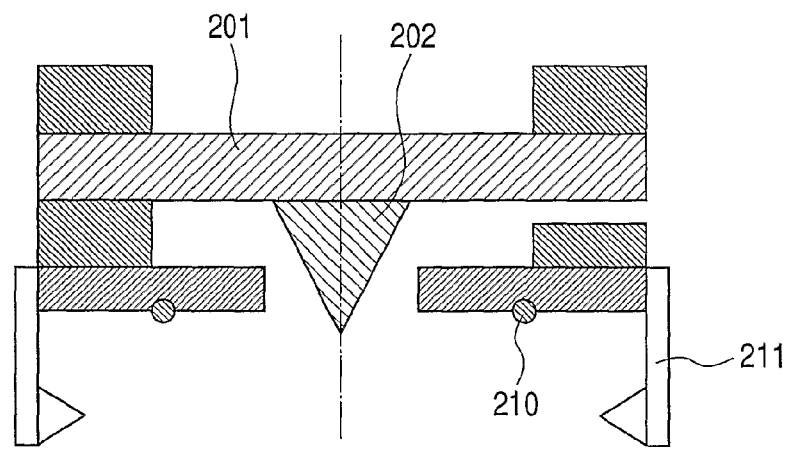
FIGS. 12A and 12B are sectional views for illustrating a second structural example of a connection mechanism according to Example 3 of the present invention.
Figure 12B:
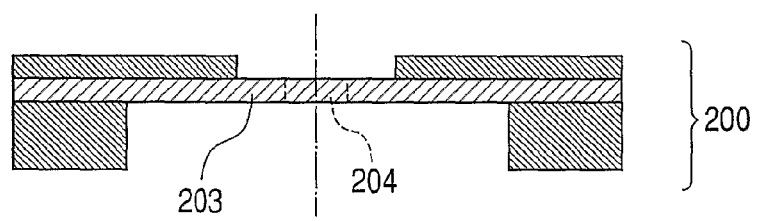

FIGS. 12A and 12B illustrate sectional views for illustrating the structural example according to this example.

In FIGS. 12A and 12B, there are provided a diaphragm 201 serving as a movable portion, a piston 202 serving as a transmission mechanism, an elastic member 203, a through hole 204, a gasket 210, and a lock mechanism 211.

One side of the connection mechanism according to this example includes the diaphragm 201 serving as the movable portion, the piston 202 serving as the transmission mechanism, the gasket 210, and the lock mechanism 211, which are connected to pipings on another side of the pipings.

Further, the other side of the connection mechanism according to this example includes a valve portion 200 to be connected to another piping and is formed from the elastic member 203 provided with the through hole 204.

Figure 13:
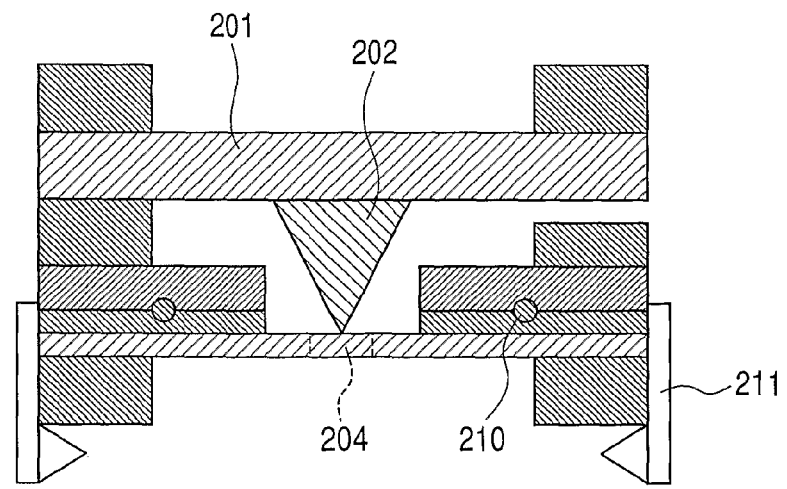
FIG. 13 is a sectional view illustrating a connection state of the second structural example of the connection mechanism according to Example 3 of the present invention.
Figure 14:
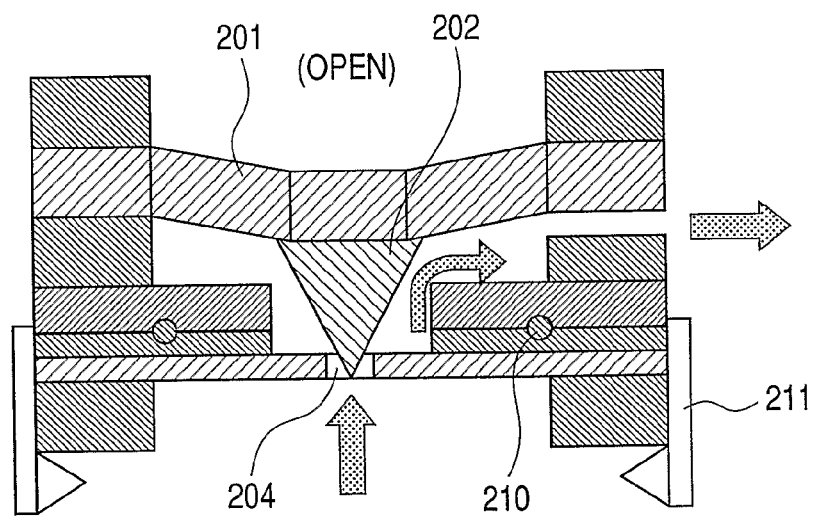
FIG. 14 is a sectional view illustrating a state where a valve is opened in the second structural example of the connection mechanism according to Example 3 of the present invention.

With reference to FIGS. 13 and 14, a description will be made of an operation of a pressure reducing valve of this example.

FIG. 13 is a sectional view of the connection mechanism of this example at the time of connection.

The connection mechanism having the diaphragm (movable portion) and the connection mechanism having the valve portion are combined with each other to be locked by the lock mechanism 211.

Further, on a contact surface, the gasket 210 prevents a fluid flowing in an inside from leaking to the outside.

The through hole 204 is normally closed. A tip portion of the transmission mechanism 202 presses to enlarge the through hole, thereby allowing the valve to open.

Figure 15:
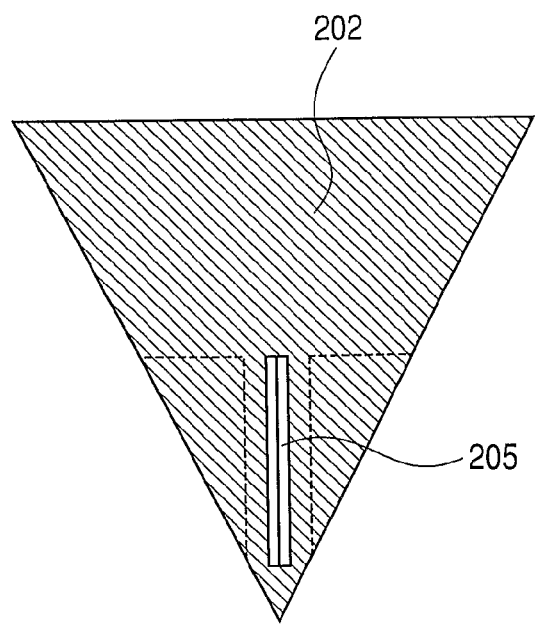
FIG. 15 is a sectional view illustrating another embodiment of a transmission mechanism of the second structural example of the connection mechanism according to Example 3 of the present invention.

A shape of the tip portion of the transmission mechanism may be a conical shape as illustrated in FIG. 12. Alternatively, as illustrated in FIG. 15, the tip portion of the transmission mechanism may further have a notch 205 in a side surface thereof.

An operation of the pressure reducing valve of this example will be described.

A pressure in an upper portion of the diaphragm (movable portion) 201 is denoted by $P_0$, a primary pressure in an upstream of the valve is denoted by $P_1$, and a pressure in a downstream of the valve is denoted by $P_2$.

When the pressure $P_2$ is higher than the pressure $P_0$, the diaphragm (movable portion) 201 is deflected upwardly and the through hole 204 is closed by elasticity of the valve portion 200, so the valve is in a closed state.

On the other hand, when the pressure $P_2$ is lower than the pressure $P_0$, the diaphragm (movable portion) 201 is deflected downwardly and the transmission mechanism 202 pushes and enlarges the through hole 204 of the valve portion 200. Therefore, as shown in FIG. 14, the valve is opened.

As a result, the pressure $P_2$ can be maintained constant. By adjusting an area and a thickness of the diaphragm (movable portion) 201, a length of the transmission mechanism 202, and a thickness and elasticity of the valve portion 200, a pressure and a flow rate at which the valve is opened and closed can be set optimally.

A pressure reducing valve of this example can be manufactured by using a mechanical machining technique in the following manner.

Figure 16A:
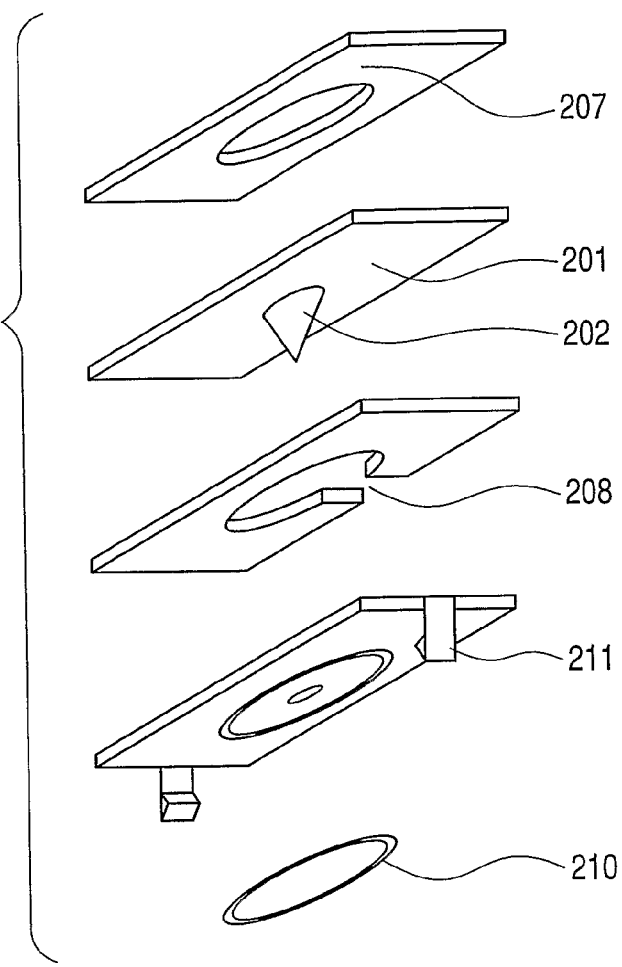
FIGS. 16A and 16B are exploded perspective views illustrating a pressure reducing valve of the connection mechanism according to Example 3 of the present invention viewed from a through hole side.
Figure 16B:
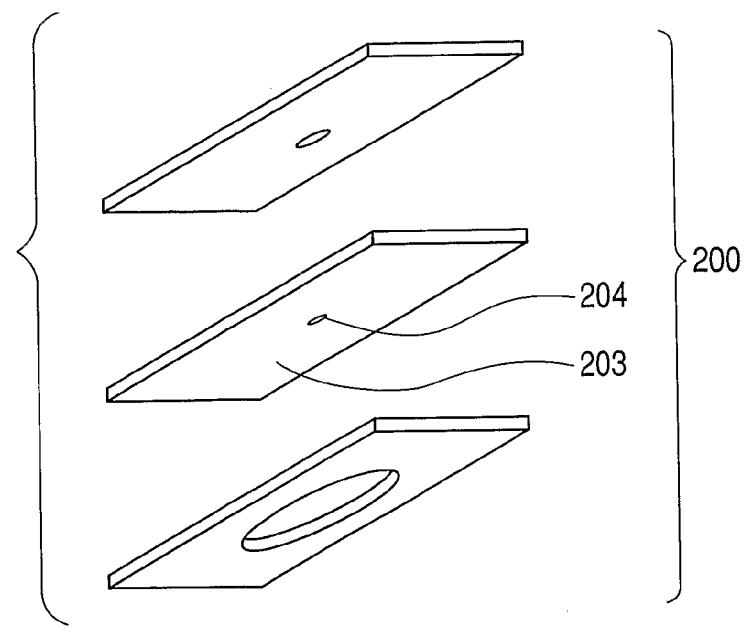

FIGS. 16A and 16B are exploded perspective views illustrating the pressure reducing valve of the connection mechanism of this example viewed from the through hole side.

First, as a material of the diaphragm (movable portion) 201, other than an elastic material such as Viton rubber and silicone rubber, a metal material such as stainless steel and aluminum can be used. There are provided the transmission mechanism 202, the elastic member 203, the through hole 204, a presser plate 207, an outlet flow path 208, the gasket 210, and the lock mechanism 211.

For example, in a case where stainless steel is used as the material of the diaphragm (movable portion) 201, the transmission mechanism can be integrated therewith by etching, cutting, or the like.

As a material of the valve portion 200, an elastic material such as Viton rubber or silicone rubber can be used.

EXAMPLE 4

In Example 4, a description will be made of a small polymer electrolyte fuel cell on which the connection mechanism of the present invention is mounted and which generates electrical energy of a few milliwatts to several hundred milliwatts.

Figure 17A:
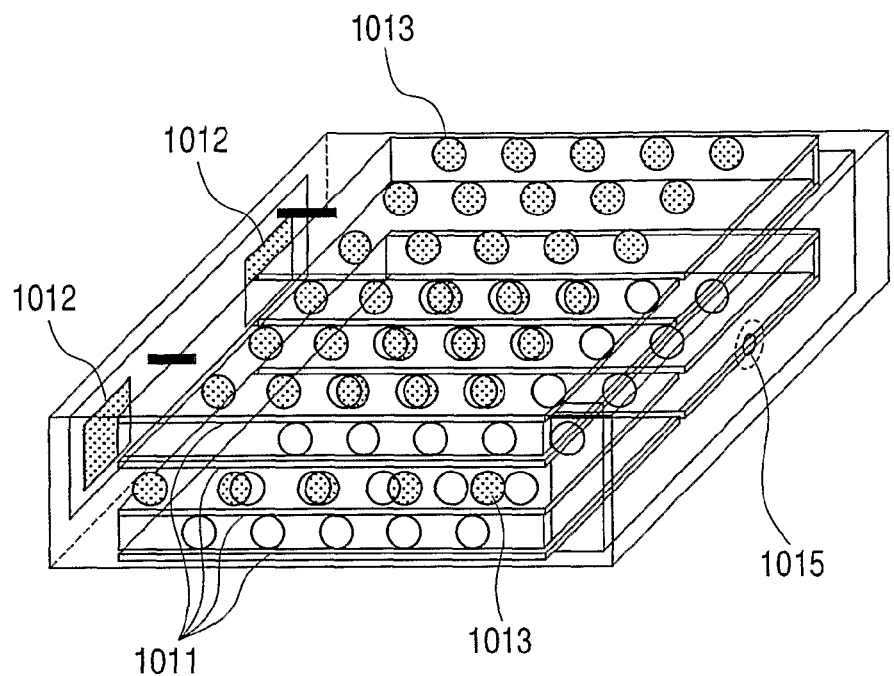
FIGS. 17A and 17B are perspective views illustrating structures of a fuel tank and a fuel cell power generation portion according to Example 4 of the present invention.
Figure 17B:
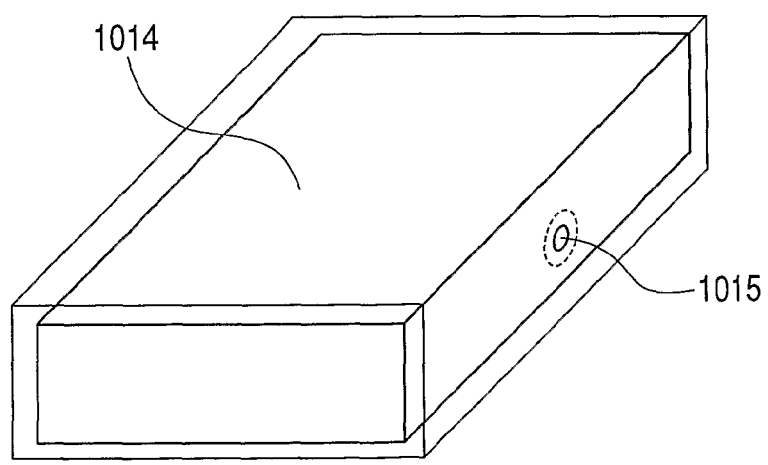

FIGS. 17A and 17B are perspective views of a fuel tank and a fuel cell power generation portion according to this example.

Figure 18:
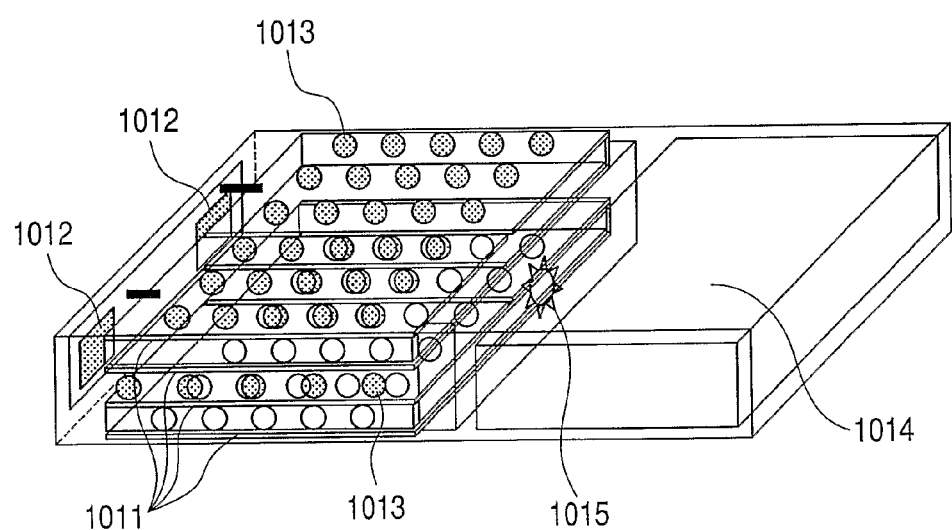
FIG. 18 is a schematic perspective view of a fuel cell in a state where the fuel tank and the fuel cell power generation portion are connected to each other according to Example 4 of the present invention.

Further, FIG. 18 is a schematic perspective view of the fuel cell in a state where the fuel tank and the fuel cell power generation portion are connected to each other.

Figure 19:
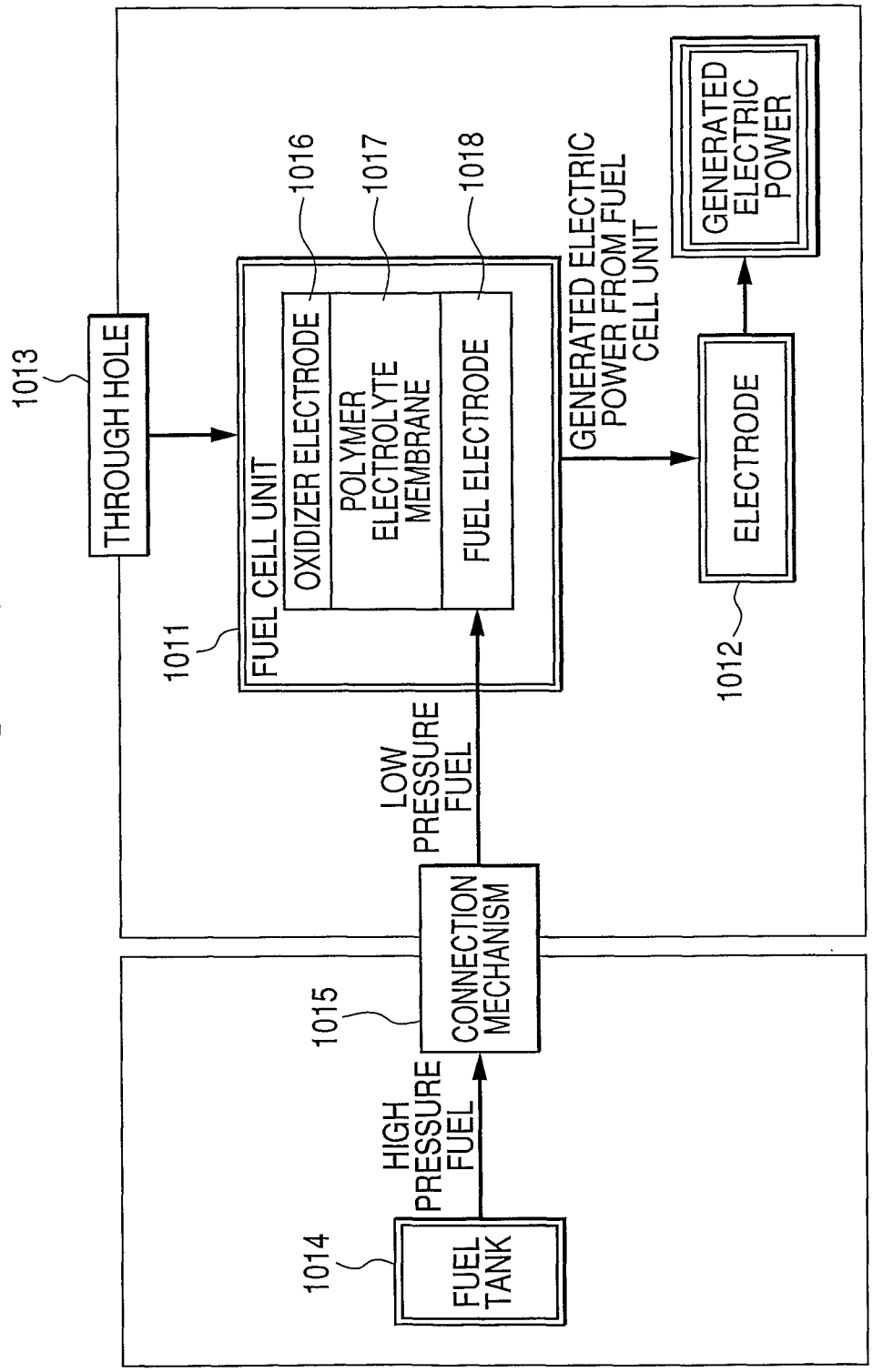
FIG. 19 is a schematic diagram of a fuel cell system according to Example 4 of the present invention.

Further, FIG. 19 is a schematic diagram of a fuel cell system according to Example 4 of the present invention. In FIGS. 17A, 17B, 18, and 19, the same reference numerals denote the same members, and there are provided fuel cell units 1011, electrodes 1012, vent holes 1013, a fuel tank 1014, a connection mechanism 1015, oxidizer electrodes 1016, polymer electrolyte membranes 1017, and fuel electrodes 1018.

An outer dimension of the fuel cell is 50 mm by 30 mm by 10 mm, which is substantially the same as a size of a lithium ion battery normally used for a compact digital camera. As described above, the fuel cell according to this example is small and has an integrated structure, thereby being easily mounted inside a mobile device.

Further, the fuel cell according to this example takes in oxygen used as an oxidizer for reaction from open air, so the fuel cell is provided with the vent holes 1013 on an upper surface, a lower surface, and side surfaces, for taking open air in.

Further, the vent holes 1013 also function to allow generated water to escape in as water vapor and to allow heat generated by the reaction to escape to the outside.

Further, an inside of the fuel cell includes the fuel cell units 1011 each of which includes the oxidizer electrode 1016, the polymer electrolyte membrane 1017, and the fuel electrode 1018, the fuel tank 1014, and the connection mechanism 1015 for connecting the fuel tank 1014 to the fuel electrode 1016 of each of the fuel cell units 1011.

The connection mechanism 1015 not only enables detachment between the fuel tank 1014 and the fuel cell power generation portion, but also has, at the time of removing, a check-valve function of preventing the fuel from leaking to the outside and preventing open air from being entered an inside of the fuel tank 1014.

Further, at the time of connection, the connection mechanism 1015 has a pressure reducing function of regulating a pressure of the fuel tank 1014 to feed a fuel.

Next, a description will be made of the fuel tank 1014 according to this example.

An inside of the tank is charged with a hydrogen storage alloy capable of storing hydrogen.

The polymer electrolyte membrane used for the fuel cell resists a pressure of up to 0.3 to 0.5 MPa. Therefore, it is necessary that the fuel cell be used within a range of differential pressure with respect to open air of 0.1 MPa or less.

As the hydrogen storage alloy having characteristics in which a pressure at which hydrogen is released is 0.2 MPa at normal temperature, for example, $LaNi_5$ is used.

When a capacity of the fuel tank is a half an entire capacity of the fuel cell, a thickness of the fuel tank is 1 mm, and a material thereof is titanium, a weight of the fuel tank is about 50 g and a volume thereof is 5.2 $cm^3$.

In a case where, in the above-mentioned fuel tank, there is provided a hydrogen occlusion material having characteristics in which a pressure at which hydrogen is released exceeds 0.2 MPa at normal temperature, it is necessary to provide means for pressure reduction between the fuel tank 1014 and the fuel electrode 1018.

Figures 20, 21:
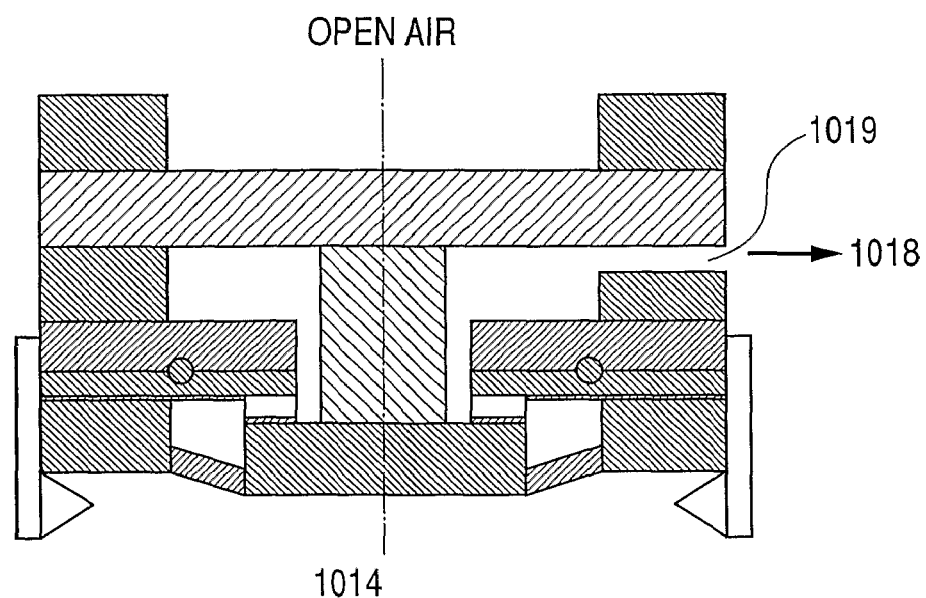
FIG. 20 is a table for illustrating a dissociation pressure of a hydrogen storage alloy ($LaNi_5$) in the fuel cell system according to Example 4 of the present invention.
FIG. 21 is a view for illustrating a positional relationship of the connection mechanism according to Example 4 of the present invention.

For example, $LaNi_5$ can absorb and desorb 1.1 wt % of hydrogen per weight. Dissociation pressures of $LaNi_5$ at each temperature are as illustrated in FIG. 20.

The hydrogen stored in the fuel tank is decompressed by the connection mechanism 1015 and is fed to the fuel electrodes 1018.

Further, open air is supplied through the vent holes 1013 to the oxidizer electrodes 1016.

Electricity generated by the fuel cell units is supplied to a small electrical equipment from the electrodes 1012.

FIG. 21 is a relational view illustrating a case where the connection mechanism of the present invention is mounted on the fuel cell.

The side of the connection mechanism 1015 having the valve portion is connected to the fuel tank 1014.

On the other hand, an outlet flow path 1019 of the side of the connection mechanism having the movable portion 1 is connected to the fuel electrode 1018. A surface of the diaphragm (movable portion) 1, which is opposite to a surface of the outlet flow path 1019, is brought into contact with the oxidizer electrode (open air).

Hereinafter, an opening/closing operation accompanied with power generation of the fuel cell will be described.

At the time of removing the fuel tank and at the time of stopping of the power generation, the valve portion of the connection mechanism 1015 is in a closed state.

When the power generation starts, the fuel in a fuel electrode chamber is consumed and a pressure of the fuel in the fuel electrode chamber decreases.

The diaphragm (movable portion) 1 is deflected to a side of the fuel electrode chamber due to a differential pressure between an open air pressure and the pressure in the fuel electrode chamber. The valve body portion 4 is then pushed down through the piston (transmission mechanism) 2 so that the valve portion is opened. As a result, the fuel is fed from the fuel tank 1014 to the fuel electrodes 1018.

When the pressure in the fuel electrode chamber is recovered, the diaphragm (movable portion) 1 is pushed up and the connection mechanism 1015 is closed.

This application claims priority from Japanese Patent Application No. 2006-232807 filed on Aug. 29, 2006, which is hereby incorporated by reference herein.

The invention claimed is:

1. A connection mechanism for fluid pipings, for connecting a plurality of the fluid pipings to flow a fluid, comprising:
    a first component provided to one side of the plurality of the fluid pipings and including a movable portion constituting a part of a pressure control valve and operated by a differential pressure;
    a second component provided to another side of the plurality of the fluid pipings and including an opening and closing mechanism which is opened and closed by an operation of the movable portion constituting the part of the pressure control valve; and
    a transmission mechanism provided to at least one of the first component and the second component, wherein:
    the opening and closing mechanism comprises a valve seat portion, a valve body portion, and a support portion for supporting the valve body portion;
    the support portion supports the valve body portion so that the valve body portion and the valve seat portion can be opened and closed with respect to each other according to the operation of the movable portion, which is transmitted by the transmission mechanism;
    the support portion for supporting the valve body portion is made of an elastic body, which is provided on a plane perpendicular to an operation direction of the transmission mechanism and including the valve body portion, for supporting the valve body portion;
    one of the movable portion and the opening and closing mechanism is separated from the transmission mechanism; and
    the plurality of the fluid pipings provided with the first component and the plurality of the fluid pipings provided with the second component are connected to each other, thereby constituting, in a part where the plurality of the fluid pipings are connected to each other, the pressure control valve for transmitting the operation of the movable portion to the opening and closing mechanism through the transmission mechanism.

2. The connection mechanism for fluid pipings according to claim 1, wherein the movable portion comprises a diaphragm.

3. The connection mechanism for fluid pipings according to claim 1, wherein the pressure control valve functions as a pressure reducing valve.

4. The connection mechanism for fluid pipings according to claim 1, wherein the support portion for supporting the valve body portion partially includes a temperature displacement portion which displaces the valve body portion to a closing position at a temperature equal to or higher than a threshold value.

5. The connection mechanism for fluid pipings according to claim 4, wherein the temperature displacement portion is made of a shape memory alloy.

6. The connection mechanism for fluid pipings according to claim 4, wherein the temperature displacement portion is made of bimetal.

7. The connection mechanism for fluid pipings according to claim 4, wherein the pressure control valve functions as a pressure reducing valve and also functions as a temperature shut-off valve.

8. The connection mechanism for fluid pipings according to claim 1, wherein:
- the opening and closing mechanism is made of an elastic body having a through hole extending in a direction perpendicular to the operation direction of the transmission mechanism; and
- the through hole is opened and closed by a tip portion of the transmission mechanism according to the operation of the movable portion transmitted by the transmission mechanism.

9. The connection mechanism for fluid pipings according to claim 1, wherein at least one of the first component and the second component comprises a gasket for preventing the fluid from leaking from portions where the plurality of the fluid pipings come into contact with each other when the plurality of the fluid pipings provided with the first component and the plurality of the fluid pipings provided with the second component are connected to each other.

10. The connection mechanism for fluid pipings according to claim 1, wherein at least one of the first component and the second component comprises a lock mechanism for maintaining connection between the plurality of the fluid pipings provided with the first component and the plurality of the fluid pipings provided with the second component when the plurality of the fluid pipings provided with the first component and the plurality of the fluid pipings provided with the second component are connected to each other.

11. The connection mechanism for fluid pipings according to claim 1, wherein the movable portion constituting a part of the pressure control valve and operated by the differential pressure, the opening and closing mechanism which is opened and closed by the operation of the movable portion, and the transmission mechanism are each formed from a sheet-shaped member or a plate-shaped member, the movable portion, the opening and closing mechanism, and the transmission mechanism being stacked on each other, thereby constituting the connection mechanism.

12. A fuel cell system, comprising:
- a fuel container;
- a fuel cell power generation portion; and
- a connection mechanism for fluid pipings, which is provided between the fuel container and the fuel cell power generation portion, wherein the connection mechanism for the fluid pipings comprises the connection mechanism for fluid pipings according to claim 1.

13. A manufacturing method for a connection mechanism for fluid pipings,
the connection mechanism comprising:
- a first component provided to one side of a plurality of the fluid pipings and including a movable portion constituting a part of a pressure control valve and operated by a differential pressure;
- a second component provided to another side of the plurality of the fluid pipings and including an opening and closing mechanism which is opened and closed by an operation of the movable portion constituting the part of the pressure control valve; and
- a transmission mechanism provided to at least one of the first component and the second component, the manufacturing method for a connection mechanism for fluid pipings comprising the steps of:
- forming the movable portion to be provided to one side of the plurality of the fluid pipings from a sheet-shaped member or a plate-shaped member;
- forming the transmission mechanism from the sheet-shaped member or the plate-shaped member;
- forming a valve seat portion, a valve body portion, and a support portion for supporting the valve body portion from the sheet-shaped member or the plate-shaped member to integrally serve as the opening and closing mechanism to be provided to another side of the plurality of the fluid pipings; and
- forming a gasket from the sheet-shaped member or the plate-shaped member on a side of the movable portion or a side of the opening and closing mechanism, wherein, in the connection mechanism, one of the movable portion and the opening and closing mechanism is separated from the transmission mechanism.

14. The manufacturing method for a connection mechanism for fluid pipings according to claim 13, wherein at least a part of the sheet-shaped member or the plate-shaped member comprises a semiconductor substrate.

* * * * *